July 20, 1965 F. W. HILL 3,196,387

TRAFFIC ACTUATED, MASTER ADJUSTED CONTROLLER

Filed Feb. 7, 1961 8 Sheets-Sheet 1

INVENTOR.
FRANK W. HILL
BY
Williams, Tilbury & Golrick

July 20, 1965 F. W. HILL 3,196,387

TRAFFIC ACTUATED, MASTER ADJUSTED CONTROLLER

Filed Feb. 7, 1961 8 Sheets-Sheet 2

INVENTOR

FRANK W. HILL

BY Williams, Tilberry & Golrick

ATTORNEY

TRAFFIC ACTUATED, MASTER ADJUSTED CONTROLLER

Filed Feb. 7, 1961

8 Sheets-Sheet 3

INVENTOR.
FRANK W. HILL
BY
Williams, Tilberry & Zobrick

July 20, 1965 F. W. HILL 3,196,387

TRAFFIC ACTUATED, MASTER ADJUSTED CONTROLLER

Filed Feb. 7, 1961 8 Sheets-Sheet 4

INVENTOR

FRANK W. HILL

BY Williams, Tilbury & Golrick

ATTORNEY

TRAFFIC ACTUATED, MASTER ADJUSTED CONTROLLER

Filed Feb. 7, 1961 8 Sheets-Sheet 5

INVENTOR.
FRANK W. HILL
BY Williams, Tilberry & Dolnick

TRAFFIC ACTUATED, MASTER ADJUSTED CONTROLLER

Filed Feb. 7, 1961 8 Sheets-Sheet 6

INVENTOR.
FRANK W. HILL
BY

July 20, 1965 F. W. HILL 3,196,387

TRAFFIC ACTUATED, MASTER ADJUSTED CONTROLLER

Filed Feb. 7, 1961 8 Sheets-Sheet 7

INVENTOR.
FRANK W. HILL
BY
Williams, Tilbury & Sprick

July 20, 1965 F. W. HILL 3,196,387

TRAFFIC ACTUATED, MASTER ADJUSTED CONTROLLER

Filed Feb. 7, 1961 8 Sheets-Sheet 8

*INVENTOR.*

FRANK W. HILL

BY

Williams, Tilberry & Golrick 3,196,387
Patented July 20, 1965

3,196,387

TRAFFIC ACTUATED, MASTER ADJUSTED CONTROLLER

Frank W. Hill, Moline, Ill., assignor, by mesne assignments, to E. W. Bliss Company, Canton, Ohio, a corporation of Delaware Filed Feb. 7, 1961, Ser. No. 87,709
20 Claims. (Cl. 340—36)

This invention relates to vehicle and pedestrian actuated traffic signal controllers having traffic actuable and non-actuable unitized devices for timing right of way sequences.

More specifically, the invention relates to unitized traffic signal controllers having one plug-in unit for timing a traffic actuated phase upon demand, one plug-in unit for timing a non-actuable phase, and one plug-in unit for coordinating and adjusting the time of start and duration of the other units in relation to timings established by a traffic sampling master controller.

The invention proposes the combination of a coordinating device remote from but controlled by a traffic adjustable master controller, a timing and control device for timing various intervals on one phase, and a unitized timing and control device for timing the various intervals on a traffic actuated second phase.

The invention comprises a new type of unitized plug-in timing and control device. At different intersections the devices may be used in different combinations to control different combinations of traffic phases. Three types of plug-in timing and control devices are employed: a master adjusted coordinating device, a timing device for one phase, and a phase timing device for the vehicle or pedestrian actuable other phase.

The invention teaches a new concept in control. The entire control and timing function for each traffic phase resides in an individual unit. One unit is provided for each phase. Each unit has full control while it is timing. During coordinated operation the units are supervised by a coordinating unit which determines when they are free to start and when they must stop. During non-coordinated operation the units obtain and retain right of way for a traffic phase substantially as it is demanded by traffic on such phase.

The invention teaches a different method of operation during non-coordinated operation. The non-actuable unit is provided with a minimum timer and the actuable unit is provided with a maximum timer. The timers for the respective phases are operative only during non-coordinated operation. One timer provides a guaranteed minimum interval to major street traffic after each minor street movement. The other timer provides a limit or maximum interval beyond which minor street traffic cannot retain the right of way.

Coordinated operation is defined as operation of the local controllers under the supervision of a master controller. Free, or non-coordinated, operation is defined as operation of the local controllers independent of a master controller. The units dwell with the right of way signal illuminated to the thoroughfare and answer demand by cross street traffic substantially as it occurs. Free operation may be permitted during times when traffic is light and is utilized when disconnected from the master.

The invention provides a failsafe feature which prevents the controller from displaying red signals to all directions of traffic after a momentary power failure. If power should fail between the time a vehicle has actuated the minor street detector and the time the non-actuable unit transfers control to the actuated unit, the detector memory relay would open and the non-actuable unit would move to its red dwell position without starting the actuated unit into its right of way timing position. A novel failsafe circuit in the non-actuable unit retains the unit in its green dwell condition if the detector memory relay has dropped open.

The invention provides simplified means for converting the non-actuable unit from two phase operation to three phase operation. A two position switch permits the unit to disregard all except the one actuable unit when it is used as a two phase controller. When used as a three or more phase controller the switch completes a novel phase selector circuit disclosed in another patent application identified hereinafter.

The master adjusted portion of the controller consists of an electromechanical timing and control device for supervising the overall traffic signal cycle. An electronic timing and control device provides means for timing intervals within the non-actuable phase sequence. The locally adjusted portion of the controller consists of the traffic actuable timing device which has electronic timing and control apparatus for timing the intervals for the actuable phase. Each of the devices is constructed on a chassis having one or more multi-pin connectors at the rear of the chassis. By plugging the devices into a rack having correspondingly positioned multi-socket connectors, the devices are connected into the circuit. A number of conductors connect the multi-socket connectors together and to a group of load relays. The load relays control the energization or deenergizatoin of the traffic signals.

The preferred form of the invention consists of a local controller having a unitary traffic actuable timing device, a non-actuable timing device, and a coordinating device which function together to time and control traffic movements at an intersection within limits set by a master controller. The preferred master controller with which the local controller is designed to cooperate is capable of varying traffic cycle length, traffic cycle split, and traffic cycle offset according to relative traffic volumes on a thoroughfare or on a grid of intersecting streets. The local controller is designed to accept information from the master controller and vary the duration, division, and offset of the traffic cycle accordingly. The local controller determines the various portions of the traffic signal cycle within limits set by the master controller. Intervals of constant duration are determined by individual electronic timers within each phase unit. Intervals of variable duration are also determined by individual electronic timers but within a framework of maximum and minimum limits established by the master controller.

One form of master controller especially suited for control of the master adjusted portion of the local controller shown herein is disclosed in United States Patent application Serial No. 778,199, filed December 4, 1958, now U.S. Patent No. 3,120,651, entitled Traffic Adjusted Traffic Control Systems, and assigned to the assignee of the present invention.

The traffic actuable unit is designed to permit some of its electronic timing circuits to time consecutively and some to time concurrently to determine the time of appearance and the duration of the various signal intervals in the actuated phase sequence. After vehicle actuation, the timing and control unit is started into operation at a particular time in the traffic signal cycle. With continued actuation the unit may extend the right of way portions of the cycle but will be forced to terminate its cycle at a time determined by the master adjusted portion of the controller. Various intervals within the actuable phase are made to vary in relation to traffic volume on that phase. When no vehicle or pedestrian actuation has been registered on the actuable phase, the right of way indication is made to reside with the non-actuable phase.

The right of way period timed by the actuable unit varies with traffic volume on that phase from a minimum to a maximum period. A minimum period follows a single actuation. The period can be lengthened by additional actuations up to a maximum period established by maximum timing means. When the device is operating coordinated with a master the period is determined by the coordinating unit means. When the device is operating non-coordinated the maximum interval is determined by timing means within the actuable unit. The coordinating unit varies the maximum period with cycle length and with cycle split i.e. the subdivision of time for each phase during one complete cycle. Cycle splits which award the actuable phase a greater percentage of the cycle also give longer maximum periods. Splits which give a lesser percentage of the cycle to the actuable phase obtain a shorter maximum period.

One of the principal features of the invention is that it provides another use for the highly versatile, standardized, actuable control unit described in a later identified patent application. The unit is shown therein to be capable of being employed in different combinations for intersections having different numbers of phases. For example, one master adjusted unit and one actuable unit is used for a two street intersection. One master adjusted unit and two actuable units are used for a three street intersection. One master adjusted unit and three actuable units are used for a four street intersection. Further, one or more of the actuable units may be added for exclusive turning movements.

While the invention is described in terms of a two phase, semi-actuated, master adjusted controller it is understood that the invention is equally applicable to three phase semi-actuated controllers, or to four or five phase semi-actuated controllers.

Another of the important features of the invention is the flexibility of signal sequences obtainable. The actuable timing unit is able to time more intervals than there are timing circuits because the circuits may be used in one manner at one intersection and in another manner at another intersection. The unit is equipped to time eleven individual vehicle intervals and two pedestrian intervals. Through various combinations of load relays and load relay circuits, various signal sequences may be obtained. The controller thus replaces a number of special controllers previously required to time different sequences. Examples of the signal intervals obtainable with the actuable unit are: advance green, normal green, trailing green, left turn, walk, trailing walk, pedestrian clearance after any of the walk intervals, vehicle clearance after any of the right of way periods, all red clearance, density initial, unit extension, minimum, and maximum. Each of these intervals and the method of obtaining them is explained in a later section.

Accordingly, the principal object of the invention is to provide a two phase master adjusted vehicle and pedestrian actuable traffic signal controller comprised of a unitary plug-in timing units for each phase.

Another object is to provide a local traffic signal controller having a rack type housing adapted to receive a master adjusted coordinating unit, a non-actuated phase unit, and one or more traffic actuable phase units.

Another object is to utilize a master adjusted coordinating unit adapted to coordinate the timing of an actuated phase unit and a non-actuated phase unit within a cycle established by a master controller.

Another object is to provide a selector circuit which permits the actuated unit in cooperation with the coordinating unit to move the non-actuated unit from its normal green dwell position and cause it to time the clearance intervals to the non-actuable phase at the proper time in the cycle.

Another object is to provide a selector circuit which permits the non-actuable unit at the end of its clearance intervals to move the actuated unit from its red dwell position.

Another object is to provide a circuit which permits the actuated unit to time out and give any remaining time to the non-actuable phase.

Another object is to provide a maximum timeout circuit which forces the actuated unit to time out at its proper split of a cycle so that right of way may be returned to a thoroughfare in time for progression.

Another object is to provide a controller made up of a number of control units which assume complete control while they are timing and which when timed out may award control to another unit.

Another object is to provide a unitized controller which may operate non-coordinated or coordinated with a master controller and having a minimum timer in a non-actuable unit and a maximum timer in an actuable unit.

Another object is to provide a control unit which may operate free of control by a master controller during periods of light traffic and coordinated with a master controller during other times.

Another object is to provide a failsafe circuit which prevents the controller from failing in an all red condition following a momentary power failure while one unit is transferring control to another unit.

Other objects and advantages will be apparent from the description of the invention which proceeds with reference to the accompanying drawings, wherein.

Figure 6:
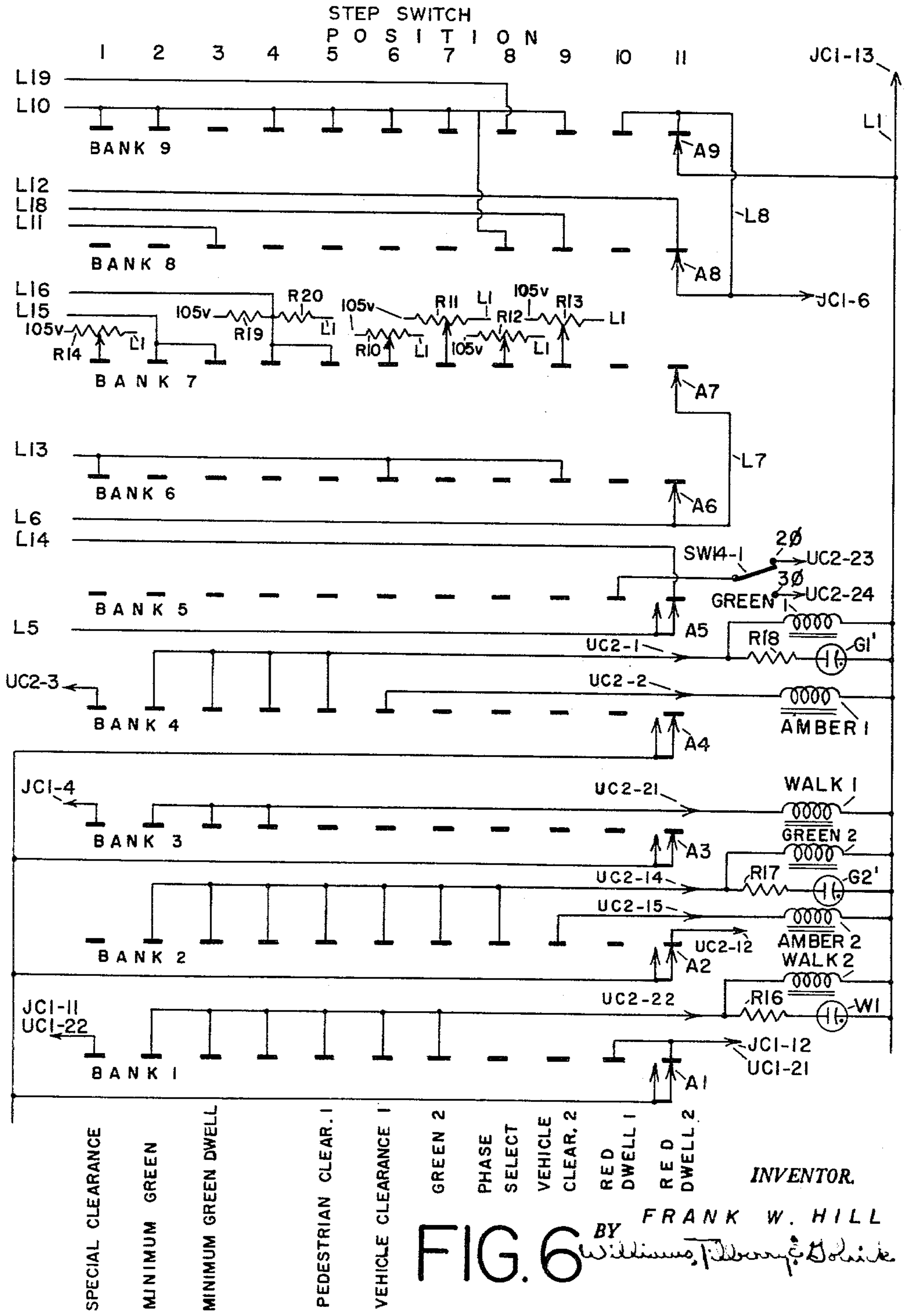
Figure 6A:
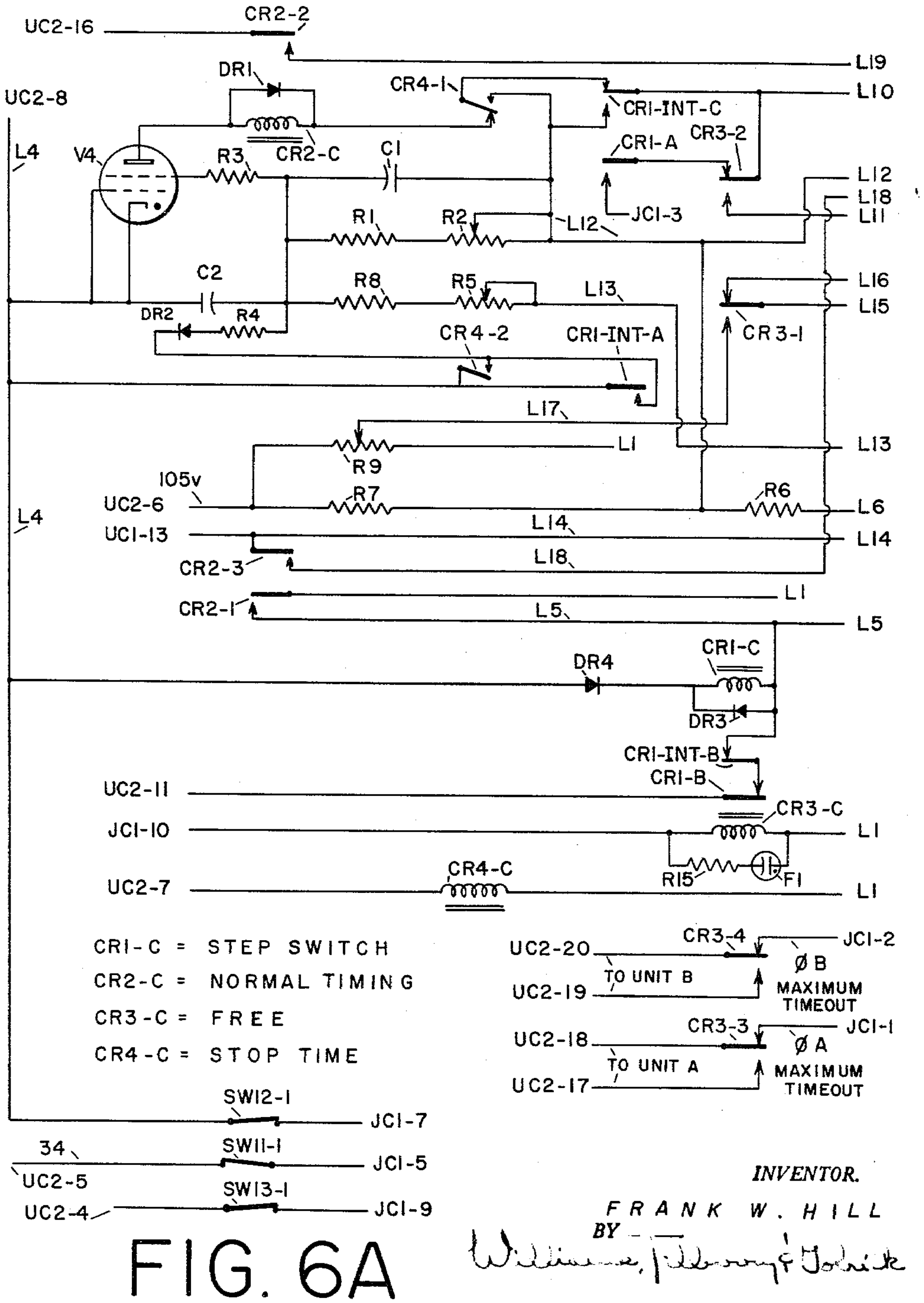

FIGURES 6 and 6A together constitute a line to line wiring diagram of the electronic non-actuable phase timing and control unit; and FIGURES 7–12 are simplified line to line wiring diagrams of the transfer circuits employed when an actuation has occurred on the actuable unit.

TYPICAL INSTALLATION

Figure 1:
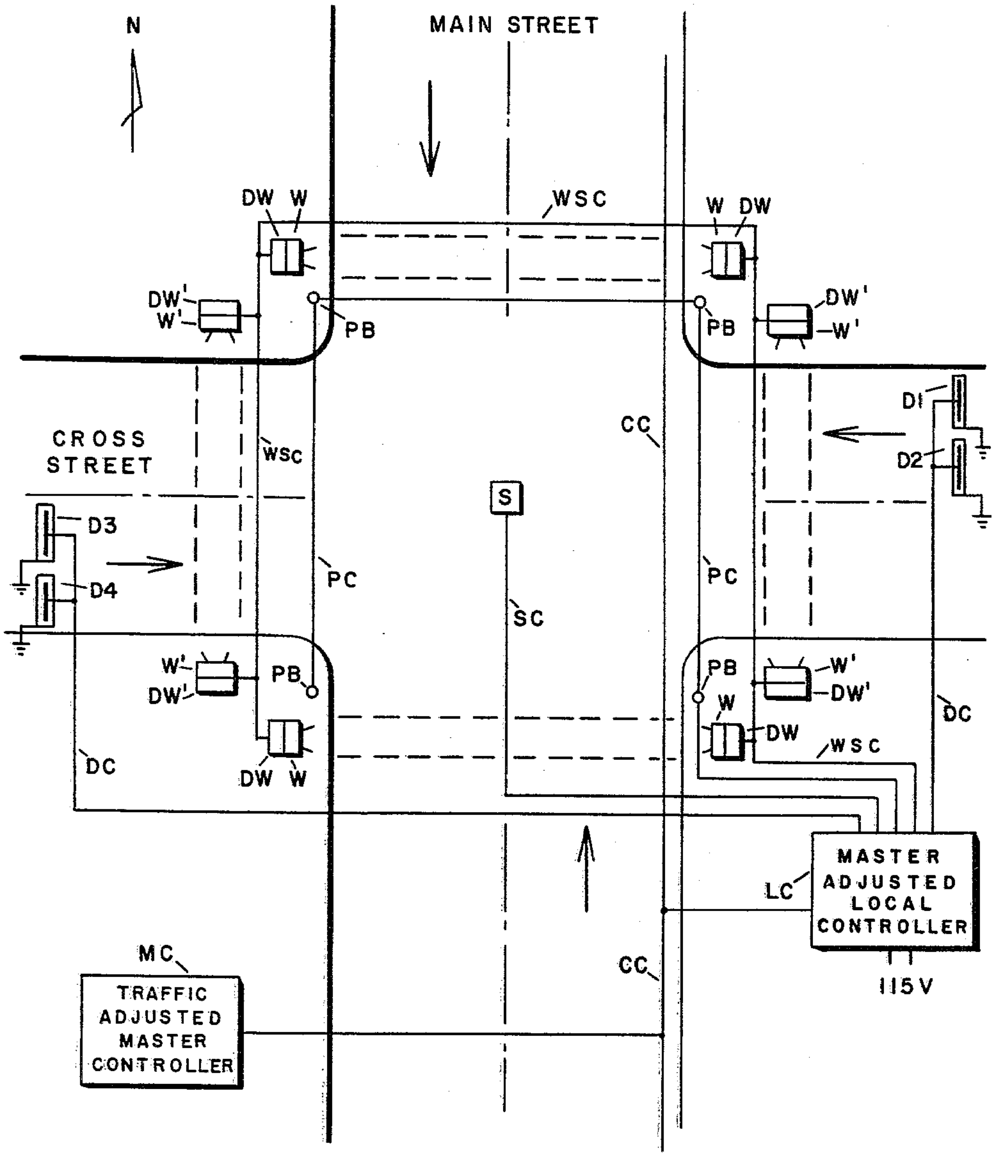
FIGURE 1 is a plan view of a two street intersection with vehicle detectors and pedestrian pushbuttons in one of the streets.

FIGURE 1 illustrates in plan view a typical two street intersection of the type intended to be controlled by the invention. The north-south street is the main street. The east-west street is the cross street. Right of way for vehicles and pedestrians normally resides with the thoroughfare and is awarded to cross street traffic after actuation of vehicle detectors D1–D4 or pedestrian pushbuttons PB. Traffic signals S are mounted over the intersection of the roadways and pedestrian signals are mounted at the ends of the crosswalks.

The vehicular traffic signals S are shown to be located at the center of the intersection but may be located over the traveled lanes and/or at the corners of the intersection.

A master adjusted local controller LC is installed near the intersection and serves to control the traffic signals S through signal cable SC and the pedestrian signals W, W', DW, DW' through multi-conductor cables. The local controller LC is connected to a source of power such as 60 cycle, 115 volt alternating current at lines 115 v.

Each local controller LC along the thoroughfare is connected to an interconnecting control cable CC or other interconnecting means which originates at a traffic adjusted master controller MC. The master controller MC samples traffic volumes on the one or more thoroughfares and on one or more representative cross streets and regulates the traffic cycle duration, the traffic cycle split, and the traffic cycle offset for all the local controllers in a given area.

Detectors D1–D4 are located in the cross street approaches and are connected to the detector input circuit or circuits of the local controller LC through detector conductors DC. Pedestrian pushbuttons PB are located at the ends of the cross walks across the thoroughfare and are connected to the pedestrian detector circuit of the local controller LC through conductor PC.

Each pedestrian signal across the thoroughfare consists of a WALK W and DON'T WALK signal DW. Each pedestrian signal across the cross street consists of an illuminable WALK W' and DON'T WALK signal DW'. The pedestrian signals are located at the ends of the crosswalks so that they will be readily visible to the pedestrian. Pushbuttons are located in close proximity, sometimes on the same standard.

The sequence of signal indications is as follows:

(a) Right of way is normally accorded to thoroughfare and pedestrian traffic is permitted across the cross street.

(b) Shortly after a vehicular actuation of one or more of the detectors D1–D4 or a pedestrian actuation of one or more of the pushbuttons PB, and at the proper time in the cycle determined by the master adjusted portion of the controller, right of way is denied to thoroughfare traffic and is accorded to cross street vehicular and pedestrian traffic. Right of way can be taken from the thoroughfare only at a time which will not disturb traffic progression along the thoroughfare. Right of way is returned to the thoroughfare in time for proper progression of vehicles along the thoroughfare.

*Control by master*

The start of the right of way periods for both the thoroughfare and the cross street are governed by the master controller MC over the local controller LC through the control cable CC. The control cable CC normally contains seven or more conductors; one and a common return for variable frequency to control traffic cycle length, two employed in binary combination with the common return to control four traffic cycle offsets, a fifth conductor to control a fifth traffic cycle offset, and two in binary combination with the common return to control four traffic cycle splits. An eighth conductor controls resynchronization, and a ninth conductor controls free operation.

Another interconnecting system may employ only three conductors: one conductor in combination with a common return for a variable frequency signal to control traffic cycle length, and another conductor in combination with the common return to transmit a carrier signal in the audible range to control resynchronization, four traffic cycle splits, and four or more traffic cycle offsets.

Yet another interconnecting system employs the pulse technique and a three conductor cable. One conductor and a common return conductor transmits a variable frequency signal to each controller to regulate traffic cycle duration. Another conductor and the common return transmits pulses from the master to a telephone type step switch in each local controller to effect changes in traffic cycle split, traffic cycle offset, and other plans of operation. When the latter conductor is not used for transmitting pulses it is employed to transmit resynchronizing power. Examples of this type of interconnecting system are shown in United States Patents 2,826,752 and 2,832,060, issued to G. Donald Hendricks, Frank Arthur Pearson, and George Leland Rambo.

This invention is not limited to a particular interconnecting system between the master controller MC and the local controllers LC, nor to any of the system referred to above. It is apparent that any suitable interconnecting system may be utilized without departing from the scope of this invention.

The pulses or tones for control of the master adjusted local controllers LC may also be transmitted by radio.

Each local controller LC is supervised by the master controller MC according to traffic volume within the grid or along one or more thoroughfares. In addition, each local controller LC receives traffic information from the traffic actuable detectors D1–D4 mounted in the cross street and from pedestrian pushbuttons PB installed at the ends of each crosswalk across the thoroughfare The master controller MC permits each local controller to display and time a cross street vehicle and pedestrian phase only at times and for durations calculated not to disturb the flow of traffic along the thoroughfare. It is expected that some units of traffic along the throroughfare will be stopped but normally the main body or platoon of traffic moving at proper speed will not be frequently stopped.

*Controller flexibility*

From the above description of one of the more simple controller installations it is not completely apparent how the many flexible features of the controller units can be utilized. It is not intended that every interval available in the controller be used at every intersection. It is sufficient that the controller employ one group of intervals at one type of intersection, another group of intervals at another type of intersection, and other intervals at yet other types of intersections. The controller has been designed to accommodate almost every type of intersection configuration.

TWO PHASE SEMI-ACTUATED CONTROLLER

Figure 2:
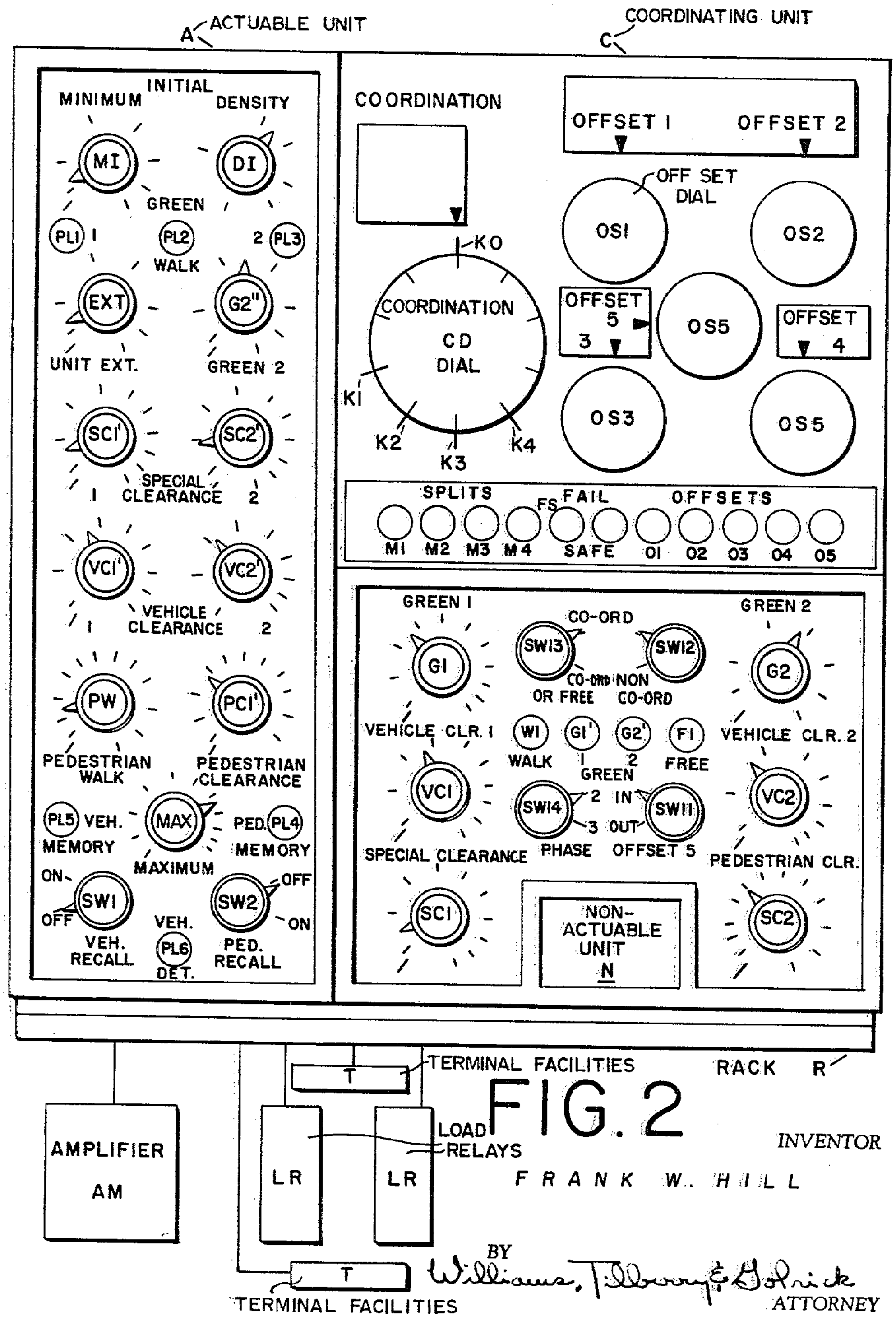
FIGURE 2 is a front view of the controller unit having one master adjusted coordinating unit, one non-actuable timing and control unit, and one vehicle and pedestrian actuable timing and control unit.

A configuration of the control unit according to the preferred form of the invention is shown in FIGURE 2. At the top right is located the coordinating unit C. Immediately below it is the electronic timing unit for nonactuable phase N. The two units jack together and together jack into a rack R. To the left is located an actuable phase unit A which also jacks into rack R. The rack is in turn located in a cabinet which protects the entire device from rain and dust. Various width racks may be provided to accommodate various numbers of actuable units. When a second actuable unit is employed for an additional phase movement, it is located to the right of N. A third actuable unit may be added to the right of the second actuable unit.

Below the actuable and non-actuable units are variable frequency amplifier AM, and the terminal facilities T and load relays LR. Various combinations of load relays are required for the various combinations of intervals and signal displays.

The coordinating unit C functions to coordinate the local controller with the master controller. The timing unit N includes the fixed interval determining dials and electronic timing circuits and load relay controls. It times the various fixed duration intervals of the nonactuable phase.

The actuable timing unit A is responsive to detectors D1–D4 in the cross street and starts its portion of the cycle at a time determined by the coordinating unit C. It times the various intervals of the actuated phase and is forced by the coordinating dial to end its portion of the cycle so that progression along the thoroughfare is not disturbed.

*Coordinating unit*

The coordinating unit C is preferably capable of adjustment by the master controller for any one of four different splits or maximum timings, any one of five different offsets, and any of a range of different cycles lengths. The split determines the division of a cycle between the thoroughfare and the cross street. The split control is effective to end the cross street phase when continued detector actuation attempt to extend the cross street right of way portion beyond the cross street porion of the cycle. The effective split control contact forces a unit A to terminate the actuated phase right of way interval if it has not already timed out.

The offset determines the percentage of a cycle that the non-actuable phase green interval at each local controller is delayed or advanced from the start of the non-actuable phase green interval at the master controller.

*Resynchronization*

Figure 5:
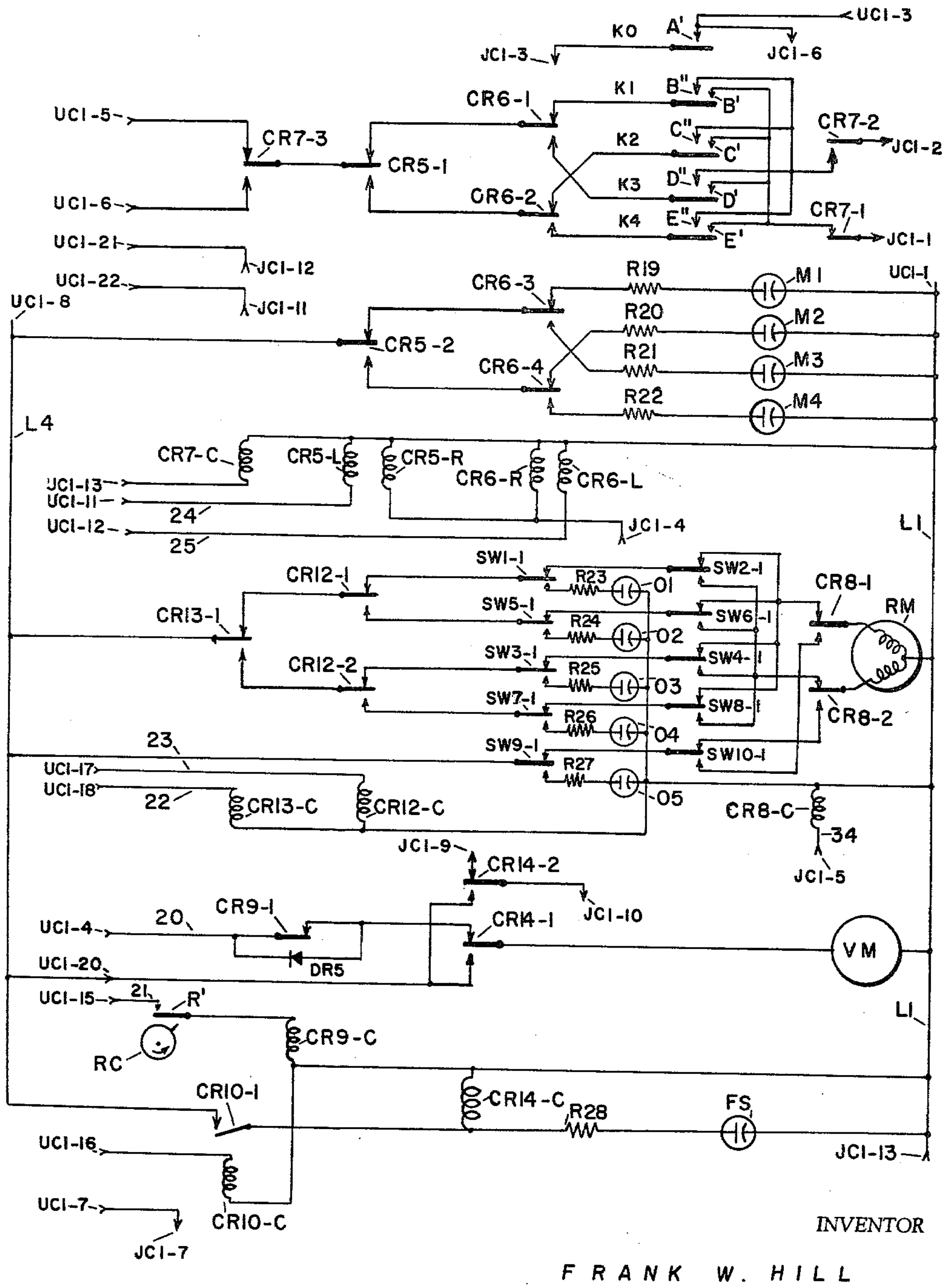
FIGURE 5 is a line to line wiring diagram of the master adjusted coordinating unit.

Within the coordinating unit C a resynchronizing circuit functions the same as in a fixed time controller to keep each local controller in synchronism with the master. A resynchronizing cam, not shown in FIGURE 2 but shown in FIGURE 5, is driven by a synchronous motor from variable frequency power supplied by an amplifier AM whose input signal is derived from the master controller. In the event of failure of the variable frequency source or amplifier AM the synchronous motor is driven from local 60 cycle power. A failsafe pilot light FS located on the face of the coordinating unit C is illuminated when the motor is operating from local 60 cycle power.

*Dial drum*

The synchronous motor mentioned above also drives the coordination dial drum CD shown in FIGURE 2 at a speed determined by the master controller. One revolution of the dial drum times one complete potential traffic signal cycle. A key K0 is inserted in the dial CD at or near its zero point to time the start of the end of the non-actuable phase if an actuation has occurred on the actuated phase. Four different keys K1–K4 are inserted in the dial CD at four different split percentages. At any given time only one of the keys K1–K4 is made effective by the master controller to time the start of the end of the actuated phase if the end has not already been started by lack of detector actuations. When one of the split control keys is responsible for the termination of the actuated phase, it is assured that the non-actuable phase will be started in time for proper progression. Four pilot lights M1–M4 on the face of the unit C show which maximum timeout (split) is made effective by the master controller.

*Offset dials*

Each of the five selectable offsets is individually adjustable over 100% of the cycle through setting of the five dials OS1–OS5 on the face of the coordinating unit C. The dials OS1–OS5 are labeled Offset 1, 2, 3, 4, and 5. The offset 1 dial OS1 at each controller is set for one pattern of traffic progression. The offset 2 dial OS2 at each controller is set for another pattern of traffic progression, and so on. One dial may be reserved from zero offset, or simultaneous operation. Switch SW11 labeled Offset 5 In/Offset 5 Out is provided to render offset 5 unresponsive to demand by the master. Five pilot lights O1–O5 on the face of unit C indicate which offset is being demanded by the master controller.

*Operation free of control from master*

The coordinating unit C is provided with a relay which frees the local controller LC from control of the master when power from the master is applied to the interconnecting circuit. When the free relay is energized it causes the unit N to dwell in its right of way interval and permits unit A to obtain right of way after a detector actuation. Right of way reverts to the non-actuable phase after the actuated phase has timed. At least a minimum interval must be timed by the non-actuable unit N before the actuated phase A can again attain right of way.

*Non-actuable unit*

The non-actuable unit is located beneath the coordinating unit C and consists of a packaged device having six timing dials, four pilot lights and four switches on the face of the unit, and a multi-bank, multi-position step switch and a number of electric timing circuits within the unit. The device is employed to time the various intervals of the non-actuable phase.

The six timing dials are entitled Green 1, Green 2, Vehicle Clearance 1, Vehicle Clearance 2, Special Clearance, and Pedestrian Clearance. They control the duration of the intervals illustrated in FIGURE 3 and listed in Table I below. Table I also shows which dial controls the timing circuit during each of the step switch positions.

TABLE I

| Step Switch Position | Interval | Dial Nomenclature |
|---|---|---|
| 1 | Advance green interval or all red clearance interval. | Special Clearance. |
| 2, 3 | Minimum green, Maximum green. | Green 1, during free operation. Timed by coordination dial CD during coordinated operation. |
| 4 | Walk interval 1 | Same as minimum green. |
| 5 | Pedestrian clearance interval 1. | Not normally available. |
| 6 | Vehicle clearance interval 1 | Vehicle Clearance 1. |
| 7 | Trailing green interval | Green 2. |
| 8 | Pedestrian clearance interval 2. | Pedestrian Clearance Don't Walk signal. |
| 9 | Vehicle clearance interval 2 | Vehicle Clearance 2. |
| 10 | Red dwell 1 | |
| 11 | Red dwell 2 | |

Figures 3, 4:
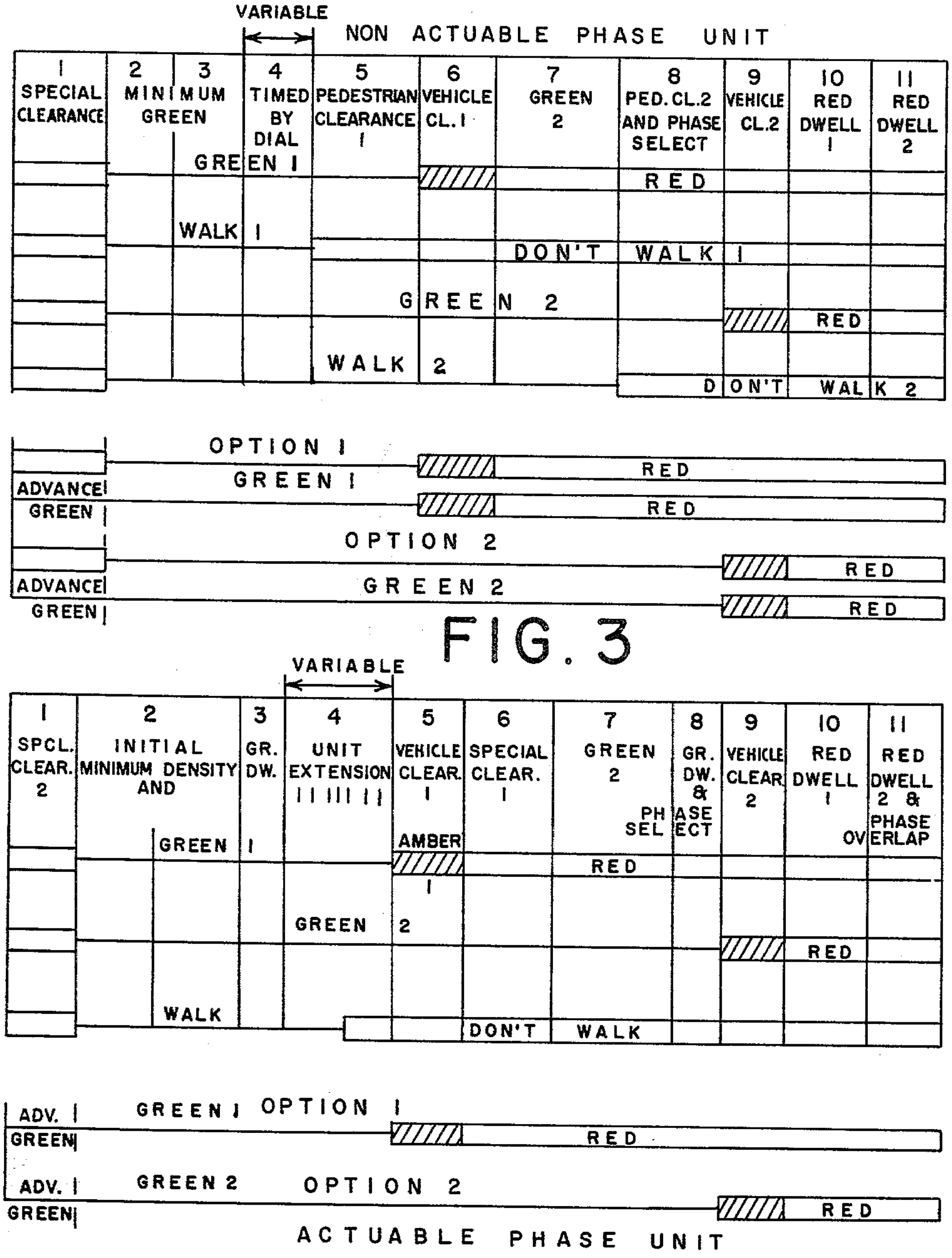
FIGURE 3 is a chart of the intervals timed by the non-actuable unit.
FIGURE 4 is a chart of the intervals timed by the actuable unit.

FIGURE 3 illustrates a number of light sequences which may be obtained with the non-actuable unit N.

The figure shows that various of the traffic signals may be energized during more than one interval. The trailing green signal, Green 2, for example, is illuminated during intervals 2, 3, 4, 5, 6, 7, and 8. FIGURE 3 also shows that under Option 1 the normal green signal period, Green 1, may be started during interval 1 or interval 2; if started at the beginning of interval 1 it is termed an advance green signal. Likewise, under Option 2, the trailing green signal period, Green 2, may be initiated at the beginning of interval 1 or interval 2. If it is started at the beginning of interval 1 it is termed an advance green signal.

All of the above named signals or intervals need not be used at every intersection. A signal can be eliminated simply by not providing it. An interval can be omitted simply by turning its timing potentiometer down to the index mark. This will give the interval a very short duration and essentially eliminate it.

The term "interval" is used herein to define the time the step switch occupies one step switch position. The term "period" is used herein to indicate the duration of time a signal is illuminated and may include one or more intervals.

As illustrated in FIGURE 3, the normal right of way period is designated Green 1 and consists of the minimum green interval and the pedestrian clearance 1 interval. It is followed by the vehicle clearance 1 interval. The special clearance interval occurring prior to the minimum green interval may be used as an all red clearance interval, or as an advance green interval as shown in Option 1. Of course, the proper load relays LR must be wired into the terminal facilities T if the advance green interval is used.

The trailing green period is designated Green 2 and consists of the sum of the minimum green intervals, the pedestrian clearance 1 interval, the vehicle clearance 1 interval, the green 2 interval, and the pedestrian clearance 2 interval. It is followed by the vehicle clearance 2 interval. The advance green interval mentioned above may also be used in advance of the trailing green period, as illustrated in Option 2.

*Pilot lights*

The non-actuable unit N is also provided with four pilot lights. Two pilot lights G1′, G2′ indicate whether the unit is timing the green 1 interval or the green 2 interval. Another pilot light W1 is illuminated during the walk interval. A fourth pilot light F1 is illuminated when the controller is operating free of the master controller.

*Switches*

The non-actuable unit N is also provided with four switches which are located on its front panel. Switch SW11, labeled Offset 5 In/Offset 5 Out, was described above with reference to the simultaneous offset. The fifth offset may be disregarded by certain local controllers which have their switch SW11 thrown to the "Offset 5 Out" position. Such local controllers respond to all other offsets demanded by the master and remain in the last demanded offset when the master controller calls for Offset 5. With switch SW11 in the "Offset 5 In" position, the local controller is able to respond to any of the five offsets demanded by the master.

A second switch is labeled Co-ord/Non-Co-ord and changes the controller from coordinated operation to non-coordinated operation. A controller whose switch SW12 is in the latter position operates synchronously from 60 cycle power and is free from coordination by the master and is able to respond to detector actuations as they occur. A controller whose switch SW12 is in the former position operates coordinated with the master through all of its functions.

A third switch SW13 is labeled Co-ord or Free/Co-ord and determines whether the local controller will be controlled by the master during both coordinated and free operation, or only during coordinated operation. When the switch SW13 is in the latter position the interconnecting circuit to the free relay is broken rendering the non-coordintaed portion of the controller inoperative. The local controller will remain coordinated with the master but when free operation is demanded the local controller will be unresponsive. The coordination dial CD will continue to time the cycle and the actuated phase unit will have to wait until the time allotted for the cross street portion of the cycle before the actuated phase unit can time a right of way interval to traffic on the cross street. A controller with its switch SW13 in the former position is able to respond to demand by the master for free operation and during free operation its actuated unit is permitted to respond to demand by cross street traffic as the demand occurs. The requirement remains that at least a minimum right of way interval be timed by the non-actuable unit N before the actuated phase can again attain right of way.

Switch SW13 is provided so that the same type of local controller may be used at outlying intersections and at intersections within a grid. At outlying or widely separated intersections it may be desired to have the master free the local controller during times of light traffic so that it may answer detector actuations from cross street traffic as the actuations occur rather than at intervals established by the master. This reduces unnecessary waiting. When the controller is used at intersections within a grid it may be desired that it never operate free, not even at times demanded by the master.

A fourth switch SW14 is labeled 2 Phase/3 Phase and has positions for adapting the non-actuable unit N for use with one actuable unit A or with two or more actuable units being turned to the number of phases in the controller.

*Non-actuable phase sequence*

Before describing the circuits within the unit N, the intervals which are adjustable and which may be included in a timing sequence for phase B will be defined. The manner of obtaining the various sequences shown in FIGURE 3 will also be described. The intervals to be defined are:

(A) Advance green or All red clearance interval
(B) Minimum green interval
(C) Pedestrian clearance interval 1
(D) Vehicle clearance interval 1
(E) Trailing green interval
(F) Pedestrian clearance interval 2
(G) Vehicle clearance interval 2

The above intervals are defined and obtained as follows:

(A) Advance green interval or all red clearance interval. This is the first interval in the sequence and may be used to time an advance indication ahead of the normal green signal to permit advance turning movements, for example. The setting on the special clearance dial SC1 determines the duration of the advance green movement. Alternately, the interval may be used as an all red clearance interval between the other phase and this phase. The setting on the special clearance dial SC1 will indicate the time that the red signals are illuminated to all streets between phase movements. All red clearance is required by some state authorities as a safety factor between traffic phases.

(B) Minimum green. The setting on the Green 1 dial G1 determines the duration of the main non-actuable phase movement when the controller is operating "free" and traffic actuations on the actuated phase or phases are heavy and require considerable time. The right of way interval to the main non-actuable phase during "free" operation is never less than the minimum set on this dial. The right of way period to the non-actuable phase is timed by coordination dial CD during coordinated operation.

(C) Pedestrian clearance interval 1. No dial is normally provided for the pedestrian clearance interval 1 but one may be added in front of and concentrically with dial PC2.

(D) Vehicle clearance interval 1. Dial VC1 determines the duration of the amber clearance interval which follows the normal green period.

(E) Trailing green interval. The Green 2 dial G2 determines the duration of a trailing right of way period. The dial setting determines the time a trailing green signal will remain on after the normal green period expires. The trailing green interval is normally used to permit vehicles to cross a wide intersection or divided highway after the normal green period has transpired.

(F) Pedestrian clearance interval 2. The pedestrian walk signal is illuminated when the right of way period commences and is extinguished prior to the termination of the phase movement. The clearance or Don't Walk signal is then illuminated for a time sufficient to permit older, less able pedestrians to walk across the intersection before any of the amber signals are illuminated. The interval set on the pedestrian clearance dial PC2 is the time which must transpire after the Walk signal is extinguished and before a vehicle clearance signal is illuminated.

(G) Vehicle clearance interval 2. The setting of dial VC2 determines the duration of the amber clearance interval which follows the trailing green period.

To illustrate the flexibility of the non-actuable timing unit the method of obtaining a variety of signaling sequences will now be described. For each signal sequence the setting of the dials will be noted in tabular form. See FIGURE 3 for a graphic illustration of each sequence.

*Normal green period*

To obtain a normal green period without advance green or trailing green or all red clearance, set the timing dials as follows:

| Step Switch Position | Dial Nomenclature | Dial Setting |
|---|---|---|
| 1 | Special Clearance | Turn down the index mark. |
| 2, 3 | Green 1 | Set at minimum right of way period required during "free" operation. |
| 6 | Vehicle Clearance 1 | Set at time required for vehicle clearance. |
| 7 | Green No. 2 | Turn down to index mark. |
| 8 | Pedestrian Clearance | Set dial at time required for pedestrian crossing. |
| 9 | Vehicle Clearance 2 | Turn down to index mark. |

*Advance green interval*

To obtain an advance green interval a head of the normal green period, the settings are as noted above with the sole exception:

| Step Switch Position | Dial Nomenclature | Dial Setting |
|---|---|---|
| 1 | Special Clearance | Set for amount of time the advance green is to come on ahead of the normal green. |

Load relays in addition to the normal green-amber relay are required.

*All red clearance*

To obtain an advance green interval ahead of the normal green period of the non-actuable phase, the settings are as noted above for the normal green period with the single exception:

| Step Switch Position | Dial Nomenclature | Dial Setting |
|---|---|---|
| 1 | Special Clearance | Set for amount of time required for the all red clearance interval. Usually a few seconds. |

No additional load relays are required. The advance green interval is not available if the timer and interval is used for all red clearance.

*Normal green and trailing green*

To obtain both the trailing green period and normal green period, and of course an amber clearance interval after each, make the following settings:

| Step Switch Position | Dial Nomenclature | Dial Setting |
|---|---|---|
| 1 | Special Clearance | Turn down to index mark. |
| 2, 3 | Green 1 | Set for minimum right of way period required during "free" operation. |
| 6 | Vehicle Clearance 1 | Set for time reqired for clearance interval after normal green period. |
| 7 | Green 2 | Set for time the trailing green is to extend beyond the normal green. |
| 8 | Pedestrian Clearance | Set dial for time required for pedestrian crossing. |
| 9 | Vehicle Clearance 2 | Set for time required for clearance interval after trailing green period. |

If desired, the special clearance timer could be used as an advance green timer ahead of the normal green period or ahead of the trailing green period. The two green intervals may thus either start together and end at two different times, or start at two different times and end at two different times.

*Pedestrian timing portion*

No special equipment or external timers are required for the pedestrian portions of the traffic signal cycle. The only pedestrian interval timing circuit found in the non-actuable unit is the pedestrian clearance interval timing circuit. The walk signals are illuminated at the beginning of the phase green interval. The walk signals remain illuminated until a detector actuation occurs on an actuated phase. As soon as an actuation occurs, the phase N timer is started into the guaranteed pedestrian clearance interval. Its duration is determined by the setting of timing potentiometer PC1 and may be made to vary from zero to thirty seconds. A reasonable duration may be a few seconds.

The pedestrian clearance interval should be set to guarantee a pedestrian sufficient time to cross the intersection if he steps off the curb at the last instant of walk interval.

*COORDINATING UNIT*

The portion of the local controller LC which coordinates the timing of the local controller with that established by the master controller will now be explained in greater detail with reference to FIGURES 2 and 5.

The function of the coordinating unit C is to determine the proper time for forcing unit N to end the phase N movement after an actuation on phase A, and for forcing the one or more actuated phase unit A to end its movement and restart the phase N. The actuated phase unit must be started at the proper split of the cycle as determined by the master controller MC. As has been explained above, a traffic adjusted master controller MC determines the most efficient traffic cycle duration, the best division of the cycle between thoroughfare and cross street traffic and the most effective offset of the start of the cycle at each succeeding intersection. After these parameters are determined they are imposed on each local controller.

Apparatus for determining or computing such parameters may be of the type well known to those skilled in the art.

Four parameters are used to define the initiation, duration, and termination of the various phase movements in a traffic signal cycle. These are traffic cycle length, traffic cycle split, traffic cycle offset, and resynchronization. They are effected at each local controller LC by the speed of coordination dial CD, the placement of dial keys K0, K1–K4, the setting of offset dials OS1–OS5, and by resynchronizing contacts R', respectively.

The speed of coordination dial CD is controlled by variable speed motor VM, FIGURE 5, and by gearing between motor VM and coordination dial CD. One revolution of coordination dial CD times one complete traffic signal cycle. Key K0, FIGURE 2, placed at or near the zero point of dial CD initiates the ending of the non-actuable phase after an actuation has occurred on the actuable phase. One of the keys K1–K4 initiates the ending of actuated phase A if it is not already ended by lack of detector actuations. Dial CD times the periods of each phase which are controllable from the master controller. The non-actuable timing unit N immediately below it times the periods of the non-actuable phase which are not controllable from the master, and actuated unit A times the periods of the actuated phase which are not controllable from the master.

Master controlled intervals include intervals within the green 1 and green 2 periods and interval within the pedestrian walk 1 and walk 2 periods. When the master controller lengthens or shortens the cycle or varies the division of the cycle between the thoroughfare and the cross street, the change takes place during the above named vehicle and pedestrian right of way periods. The intervals timed by the electronic timing circuits remain fixed. This is true for both the non-actuable phase and the one or more actuable phases. Additional keys K5–K8 (not shown) may be inserted into the slots on dial CD to time a third phase. Keys K1–K4 would be moved ahead clockwise and the new keys inserted between key K4 and key K0.

*Maximum timeout contacts*

Keys K0–K4 on coordination dial CD are termed split control keys or maximum timeout keys. "Split control" is intended to indicate that the keys and associated contacts determine the maximum percentage of a cycle that may be awarded to the cross street. "Maximum timeout" is intended to indicate that the split control keys operate on the maximum timer and cause it to time out at the designated split of the cycle.

Coordinating unit C includes a group of contacts operated by keys K0–K4. Included are single throw contacts A′ and four sets of double throw contacts B′–E′. One contact B″–E″ in each set of the four latter contacts is usable when a second actuable unit is employed, as at a three-phase intersection.

The keys K0–K4 are insertable in slots on the periphery of dial CD. K0 is set at or near the zero point on dial CD and operates contacts A′ to cause the termination of the non-actuable phase N at a particular time in the cycle after an actuation has been registered on phase A. Key K0 has a projection in a front, or zero, position which operates contacts A′ to urge unit N to begin timing the end of phase N.

One of the other keys K1–K4 is effective to operate its set of contacts B′–E′ to cause actuated unit A to start timing the end of phase A. Key K1 has a projection in the first position back, in line with contacts B′, which are made electrically effective when split S1 is in effect. Key K2 has a projection in the second position back, in line with contacts C′, which are electrically effective when split S2 is in effect. Likewise, keys K3 and K4 have projections in the third and fourth position back, respectively, in line with contacts D′ and E′, which are effective when splits S3 and S4 are in effect, respectively.

These maximum timeout contacts and circuits are illustrated near the top of FIGURE 5. The circuit is made up of a plurality of paths only one of which is effective at any one time to end the phase A movement at the proper percentage split of the cycle. Which of the contacts and paths is made effective is determined by the split control relays CR5–L and CR6–L. Which of the split control relays is energized depends upon which of the split control conductors 24 or 25 is energized. For split S1 to be in effect, neither of the control conductors is energized. For split S2 to be in effect, split control conductor 24 is energized. For split S3 to be in effect, control conductor 25 is energized. For split S4 to be energized, both conductors 24 and 25 are energized.

One path is always complete through the split control or maximum timeout contacts. Contacts B′ determine the timeout of the phase A unit when split S1 is in effect. Contacts C′ control the timeout when split S2 is in effect. Contacts D′ control the timeout when split S3 is in effect. Contacts E′ cause the timeout when split S4 is in effect. The maximum control relay CR7–C permits the device to be used for two or three phase operation and permits the first set of keys K1–K4 to cause the timeout of the phase A unit and enables a second set of keys, when used, to cause the timeout of a third phase.

*Coordinating unit circuit*

Referring more specifically to FIGURE 5, the circuitry within the coordinating unit C is shown in schematic line to line form. The circuits controlled by the coordination dial CD are shown near the top of the drawing and include contacts A′ operated by key K0, and the four sets of contacts B′–E′ operated by keys K1–K4, respectively. Contacts B″–E″ are operated by keys K5–K8 when provided. Immediately below are the four pilot lights M1–M4 that indicate which of the four split or maximum timeout contacts B′–E′ is effective. The split control latch relay coils CR5–L, CR6–L, and release coils CR5–R, CR6–R are shown near the center of the drawing. The reversible motor RM and the offset control relay contacts CR12–1, CR12–2, and CR13–1 and switches SW1–1 to SW10–1 and the offset pilot lights O1–O5 are illustrated next. Near the bottom of the diagram is the variable speed motor VM which drives the coordination dial CD. Illustrated also are the failsafe relay contacts CR10–1, the resynchronizing contacts R′, and the free relay contacts CR14–1, CR14–2.

As has been explained above, the function of the coordination dial CD is to time the master adjusted portions of the various phase movements. This includes the normal and trailing green periods of both the actuable and non-actuable phases, and the pedestrian walk period of both phases. The timing of the master adjusted periods of the non-actuable movement is determined by the spacing between the effective one of keys K1–K4 and key K0. The timing of the master adjusted periods of the actuated phase movement is determined by the spacing between key K0 and the effective one of keys K1–K4. Key K0 closes contacts A′ once each revolution of dial CD. If a vehicle detector actuation has occurred on the cross street the vehicle detector memory relay in unit A is energized and L1 power is available to the A′ contacts through unit connector UC1–3. When contacts A′ close, L1 power is applied to jumper connector JC1–3. Jumper connector JC1–3 in the non-actuable unit N, upper right FIGURE 6A, thus has L1 power applied to it. L1 power is thereby applied to the plate circuit of the timing tube V4 in unit N. When tube V4 conducts it energizes its plate circuit relay which in turn energizes its step switch out of its green dwell position. Once out of its dwell position the step switch in unit N times the clearance intervals and traffic change intervals and comes to rest in its red dwell position. The circuitry within the non-actuable timing unit will be described in greater detail later with reference to FIGURES 6 and 6A.

The closure of contacts A′ thus results in the initiation of the termination of the non-actuable phase movement after an actuation has occurred on the cross street. As soon as the step switch in the non-actuable unit N completes the timing and display of the clearance intervals to the non-actuable phase and reaches its red dwell 1 position it triggers the actuated unit A from its red dwell 1 position. Actuated unit A times an advance green interval, a density initial interval, and moves to the green dwell position. Unit A does not dwell in the green dwell position because L1 power from the non-actuable unit N immediately energizes the unit A step switch into the unit extension interval. At the end of one unit extension interval, assuming no more detector actuations, the step switch in actuated unit A moves through and times the various clearance intervals and stops in the red dwell 1 interval. In the red dwell 1 interval it triggers the non-actuable unit N out of its red dwell 1 position through its special clearance intervals to its green dwell position.

Thus, one actuation of a cross street detector D1–D4 causes the non-actuable phase unit N to start timing when key KO closes contacts A′. After the non-actuable unit N times and displays the end of the non-actuable phase it starts the actuated unit A. Actuated unit A times the right of way and clearance periods for the cross street and comes to rest in its red dwell interval where it restarts the non-actuable unit. The non-actuable unit times an advance green interval if called for and stops in its green dwell position. The cross street right of way period does not consume the full time allowed when only one or a few actuations occur. The remainder of the time is awarded to thoroughfare traffic.

*Maximum timeout keys*

The above action resulted from a single detector actuation of one of the cross street detectors D1–D4. If more than one actuation of the cross street detectors occurs during the time right of way is denied to cross street traffic or during the time right of way is awarded to cross street traffic, these continued detector actuations lengthen the cross street right of way period. Actuations during the time right of way is denied to cross street traffic extend the initial portion of the right of way period. Actuations during the unit extension interval cause the unit extension interval to be extended. If either or both of these actions attempt to cause the actuated phase to extend beyond a time which would prevent its completion before the time established for progression along the thoroughfare, the effective one of the maximum timeout keys K1–K4 causes the actuated phase unit A to time out.

The maximum timeout circuit receives L4 power from the step switch in the actuated unit A while it is in the density initial interval, the green dwell interval, and the unit extension interval. A portion of the maximum timeout circuit is illustrated in FIGURE 5 and includes unit connector UC1–5, normally closed phase control contacts CR7–3, split control contacts CR5–1 in the position shown, split control contacts CR6–1 in the position shown, contacts B′ when closed, normally closed contacts CR7–1, and jumper connector JC1–1. In the non-actuable unit N, FIGURE 6A, L4 power on jumper connector JC1–1 shown at the bottom of the figure flows to unit connector UC2–18 through normally closed free relay contacts CR3–3. Unit connector UC2–18 is connected by wiring behind rack R with unit connector UC2–18 of the actuated unit A. When L4 power is applied to unit connector UC2–18 of actuated unit A it parallels the normal timing circuit and energizes the normal timing relay coil. The normal timing relay energizes the step switch coil and forces actuated unit A to time its traffic clearing intervals and stop in its red dwell 1 position. L4 power also energizes the detector memory relay coil which holds in through self holding contacts and calls in an actuated phase movement during the next cycle.

Through the above described action the actuated unit A is forced to end its right of way periods and to time its clearance intervals and return right of way to the non-actuable phase in time for progression along the thoroughfare. The circuits within actuated unit A will be described in greater detail in a later section.

It can be seen that surplus time remaining after short right of way periods to the actuated phase is given to the non-actuable phase. Also, the actuated phase unit can never hold the right of way past the time established for starting the non-actuable phase.

*Other splits*

The above described action takes place when neither of the split control conductors 24, 25, FIGURE 5, is energized. This corresponds to split S1. Key K1 is effective to close contacts B′ at the proper percentage of the cycle and urge the actuated unit A out of its right of way period. Neither of the split control relay latch coils CR5–L or CR6–L is energized. Pilot light M1 is illuminated to indicate that split S1 is in effect. Its circuit includes line L4, contacts CR5–2 in the position shown, contacts CR6–3 in the position shown, limiting resistor R19, neon lamp M1, and line L1.

*Split S2*

When the master controller MC senses that the ratio of thoroughfare traffic to cross street traffic has changed sufficiently to warrant that split S2 should be in effect, it energizes interconnecting conductor 24. L2 power flows into the coordinating unit C, FIGURE 5, through unit connector UC1–11 and energizes the latch coil CR5–L. Split control contacts CR5–1 and CR5–2 do not transfer until the release coil CR5–R is energized. The release coil CR5–R is energized when the step switch in the non-actuable unit N moves into the special clearance interval. Referring for a moment to FIGURE 6, the step switch contact on bank 3, position 1 is connected to jumper connector JC1–4. The bank 3 arm A3 is connected to line L4. When the step switch leaves its red dwell 2 position 11 and moves to its special clearance position 1 it energizes jumper connector JC1–4.

Referring to FIGURE 5, when L4 power is applied to jumper connector JC1–4 shown near the center of the figure, both release coils CR5–R and CR6–R are energized. The release coils release the armature attracted by the energized latch coil and permit it to be latched into position if power on the latch coil persists until the release coil is deenergized. The split control line 24 is energized continuously while split S2 is desired. In this manner contacts CR5–1 and CR5–2 are transferred as soon as the non-actuable unit N moves into its special clearance interval. Thus, a new split is placed into effect at the beginning of a cycle and not at some indefinite time within the cycle.

It should be noted here that the time for energizing the release coils must be properly chosen when the unit is designed. If not, the split may be changed at a time which may disrupt the cycle. For example, the non-actuable unit may be timing a split which provides a large percentage of time to the non-actuable phase when the master controller attempts to change the split to one which provides a lesser percentage of time. Assume that key K4 on coordination dial CD is the effective key and key K1 is being called for. If key K1 has passed contacts A′–E′ when the master changes from key K4 to K1, a very long cycle would be timed for the non-actuable phase and the actuated phase would not be started until one and one-half cycles had transpired, that is, until dial CD has made another revolution.

To circumvent this difficulty the latch relays are unlatched and relatched at a time which will not disrupt the cycle or cause any long intervals in the cycle.

To continue with the description of the circuit employed when split S2 is in effect and an actuation of one of the detectors D1–D4 has occurred, assume that the non-actuable unit N is timing the right of way period to the thoroughfare. Key KO and the circuit through contacts A′ will be effective to initiate the beginning of the end of the non-actuable phase. Key K2 and the circuit through contacts C′ will be effective to initiate the beginning of the end of the actuated phase.

Figure 9:
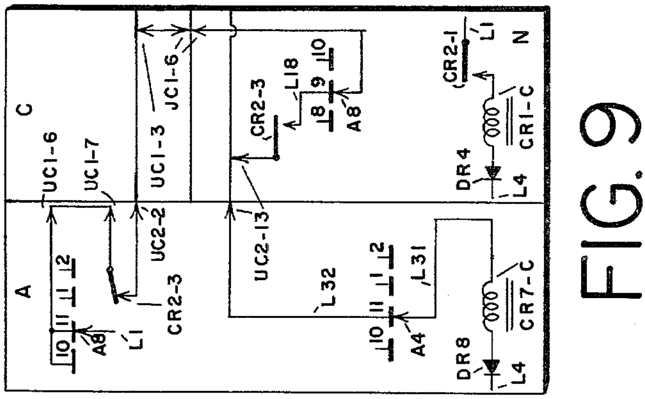

When the actuated phase unit A, FIGURE 9, answers the detector actuation and proceeds to its density initial interval, green dwell interval, and unit extension interval, contacts in positions 2, 3, 4 of its step switch apply power through arm A2 to its unit connector UC1–12. (See FIGURE 10.) Wiring behind the rack R jumpers the phase A unit connector UC1–12 to the non-actuable unit N unit connector UC1–5. L4 power is thus applied to unit connector UC1–5 in unit C, FIGURE 5.

The portion of the maximum timeout circuit included in coordinating unit C is shown in FIGURE 5 and includes unit connector UC1–5 shown near the top of the figure, normally closed relay contacts CR7–3, now transferred split control contacts CR5–1, split control contacts CR6–2 in the position shown, contacts C′ when closed by key K2, normally closed contacts CR7–1, and jumper connector JC1–1. Within the non-actuable unit N, FIGURE 6A, the circuit includes jumper connector JC1–1 shown near the bottom of the figure, normally closed free relay contacts CR3–3, and unit connector UC2–18. Unit connector UC2–18 of the non-actuable unit N is jumpered behind rack R to unit connector UC2–18 of actuated unit A. Within actuated unit A, FIGURE 10, the circuit applies L4 power directly to the normal timing relay coil and the memory relay coil when contacts C' close. This causes the step switch to step from the unit extension interval and thence to time the clearance intervals. This forces actuated unit A to time out phase A at the proper time in the cycle to maintain progression at the new split of the cycle.

When split S2 is in effect, pilot light M2 is illuminated. Its circuit includes line L4, now-transferred contacts CR5–2, contacts CR6–4 in the position shown in FIGURE 5, limiting resistor R20, neon glow tube M2, and line L1.

*Split S3*

For split S3 to be in effect, split control conductor 25 must be energized. When conductor 25 is energized, latch relay coil CR6–L is energized and contacts D' are made effective to control the termination of actuated phase A. The circuit includes unit connector UC1–5, contacts CR7–3 in the position shown in FIGURE 5, contacts CR5–1 in the position shown, now-transferred contacts CR6–1, contacts D' when closed by key K3, normally closed contacts CR7–1, and jumper connector JC1–1. Within the non-actuable timing unit N, FIGURE 6A, the circuit connected to jumper connector JC1–1 includes normally closed free relay contacts CR3–3 and unit connector UC2–18. Unit connectors UC2–18 of both the non-actuable unit N and the actuated unit A are jumpered together behind rack R. Within unit A, FIGURE 10, application of L4 power to unit connector UC2–18 energizes both the normal timing relay coil CR5–C and the memory relay coil CR2–C. Thus, if the actuated unit is still timing because of repeated detector actuations it will be forced to time the clearance intervals and relinquish right of way in time for the non-actuable phase right of way period. The memory relay is energized and serves to reinitiate an actuated phase right of way period during the following cycle.

During the time split S3 is in effect, the maximum timeout pilot light M3 is illuminated. Its circuit includes line L4, contacts CR5–2 in the position shown in FIGURE 5, now-transferred contacts CR6–3, limiting resistor R21, neon glow tube M3, and line L1.

*Split S4*

Split S4 and key K4 are effective when both split control conductors 24 and 25 are energized. When both latch relay coils CR5–L and CR6–L are energized they complete the circuit through split control contacts E'. The circuit is as described above for the non-actuable unit N and for actuable unit A.

The chief difference is in the coordinating unit C. In FIGURE 5 the circuit which causes the termination of the phase A movement includes unit connector UC1–5, normally closed contacts CR7–3, now-transferred contacts CR5–1, now-transferred contacts CR6–2, contacts E', normally closed contacts CR7–1, and jumper connector JC1–1. Contacts E' and key K4 are effective to end the phase A movement at a particular time in the cycle.

The circuit for the maximum timeout indicator lamp M4 includes line L4, now-transferred contacts CR5–2, now-transferred contacts CR6–4, limiting resistor R22, neon glow tube M4, and line L1.

*General*

As explained above, none of the split control relay contacts CR5–1 and CR5–2, and CR6–1 to CR6–4 operate until the release coils CR5–R and CR6–R are energized at the proper time in the cycle. This insures that the split takes place at a time that will not disrupt the traffic signal cycle. It will be noted that the maximum timeout circuit within actuable unit A and non-actuable unit N is identical for all splits; the circuit in the coordinating unit C is the only portion which varies with the different splits.

*Offset control*

Having described the operation of the maximum timeout circuit, the offset control apparatus will now be explained. The offset control switches and contacts are illustrated in electrical symbols near the center of FIGURE 5. The offset dials OS1–OS5 are part of the coordinating unit C illustrated in FIGURE 2.

Basically, an offset selector mechanism consists of remotely controlled apparatus for shifting the start of a traffic signal cycle at a local controller with respect to the start of the cycle at a master controller. Various methods and means have been devised to accomplish this control.

*Resynchronizing means*

Before describing the action of the offset control mechanism, the resynchronizing means must first be explained. In order for the cycle at the local controller LC to be kept in step with the cycle at the master controller MC, a resynchronizing cam RC in the coordinating unit C, FIGURE 5, is kept in step with a similar cam in the master controller. While the two cams revolve in identical angular relationship with each other and at identical speeds, the two units are synchronized. Power from the master controller is normally applied to resynchronizing line 21 during approximately 97% of the traffic signal cycle. A projection on cam RC in the master controller opens a contact and interrupts resynchronizing power once a cycle. If the local coordinating unit C, FIGURE 5, is in step with the master, a projection on cam RC closes contacts R' for approximately 1% of the cycle but only when line 21 is deenergized. Thus, when the local and master are in synchronism, contacts R' are closed at the precise moment when their closure is ineffective to stop motor VM.

If a local controller should get out of step with the master, the projection on cam RC would close contacts R' and admit L4 power from line 21 and unit connector UC1–15 to resynchronizing relay coil CR9–C. Contacts CR9–1 would open and interrupt power to the motor VM which drives coordination dial CD and resynchronizing cam RC. The local controller would then stop until power to line 21 is interrupted. Power to line 21 is interrupted for only approximately 3% of the traffic signal cycle as explained above. When power is interrupted, relay coil CR9–C is deenergized, contacts CR9–1 are closed, and motor VM is reenergized. The local controller thus starts out in synchronism with the master.

The function of the offset control mechanism is to delay or advance the start of the cycle at the local controller with respect to resynchronizing cam RC, and thus with respect to the master controller. The prime mover of the offset control mechanism is reversible motor RM which is operated intermittently in a forward or reverse direction to rotationally displace coordination dial CD with respect to the rise on resynchronizing cam RC. Switches SW1–1, SW3–1, SW5–1, SW7–1 and SW9–1 control the duration of energization of motor RM after a new offset is called for by the master controller. Switches SW2–1, SW4–1, SW6–1, SW8–1, and SW10–1 control the direction of rotation of motor RM. They determine whether the forward winding or reverse winding is to be energized.

The above switches are grouped in pairs above the offset dials OS1–OS5 shown in FIGURE 2. Each pair of switches SW1–1, SW2–1 to SW9–10, SW10–1 is controlled by a pair of cams behind the offset dials. A first progression plan may be set up on dial OS1 in each controller along the thoroughfare. A second progression plan may be set up on dial OS2 in each controller. Similarly, progression plans may be set up on dials OS3 and OS4. The fifth dial OS5 is normally set at zero to provide a simultaneous offset. The dials are calibrated in percent; dials at successive intersections are set at the percent of a cycle that the start of the cycle at that intersection is to be delayed from the prior intersection. The proper dial setting is determined from a conventional time-space diagram known to those skilled in the art of traffic control.

Offset control conductors 22, 23, and 34 determine which of the cams and switches SW1–1 to SW10–1 is to be effective in determining the offset. Conductors 22, 23, and 34 may be interconnected with the master controller and energized therefrom, or they may be connected to a translating device in the local controller which converts a burst of audible frequency signal to a steady flow of current.

Offset control conductor 22, 23, and 34 control relay coils CR13–C, CR12–C, and CR8–C, respectively. When all of the conductors are deenergized after one or more of them has been energized, a circuit will exist for a time through switches SW1–1 and SW2–1 to one of the windings of reversible motor RM. The circuit includes line L4, contacts CR13–1 in the position shown in FIGURE 5, contacts CR12–1 in the position shown, switch contacts SW1–1, switch contacts SW2–1, contacts CR8–1, one winding of reversible motor RM, and line L1. The reversible motor RM will rotate all of the offset controlling cams in the direction to effect offset O1 in the least rotation and time as determined by the position of switch SW2–1. Switch SW2–1 is controlled by a half cam which positions the actuator and thus the movable contact of switch SW2–1 so that the motor winding which is energized rotates the cam in the shorter direction to the offset desired. When the cam reaches the offset percentage set on dial OS1, switch SW1–1 transfers and deenergizes motor RM and energizes the offset indicator lamp O1 through limiting resistor R23.

To place offset control dial OS2 and offset O2 in effect, line 22 is energized by the master controller. Line 22 energizes relay coil CR13–C which transfers contacts CR13–1. The circuit now includes line L4, now-transferred contact CR13–1, contacts CR12–2 in the position shown in FIGURE 5, switch contacts SW3–1 in the position shown, switch contacts SW4–1, normally closed contacts CR8–1, motor RM, and line L1. Switch SW4–1 may already be in the transferred position in which case power will flow through contacts CR8–2 to the other winding of reversible motor RM. When motor RM rotates the cams, the one controlled by offset dial OS2 will rotate until the actuators of switches SW3–1 and SW4–1 transfer at which time power is interrupted at switch SW3–1 and is diverted from motor RM to the neon indicator lamp O2. The coordination dial CD is now offset from the resynchronizing cam RC by the percentage of a cycle set on offset dial OS2. Offset O2 is thus placed in effect.

To place offset O3 in effect, control conductor 23 is energized and conductor 22 is deenergized. Relay coil CR12–C is thus energized and relay coil CR13–C is deenergized. A circuit will exist through switch contacts SW5–1 and SW6–1 until offset O3 is completed. The circuit includes line L4, contacts CR13–1 in the position shown in FIGURE 5, now transferred contacts CR12–1, switch contacts SW5–1, switch contacts SW6–1 in either position, normally closed contacts CR8–1 or CR8–2, either winding of reversible motor RM, and line L1. Motor RM will rotate in the direction required to effect offset O3 in the shorter distance and least time. When the desired percentage offset is reached, the cam on offset dial OS3 will transfer switch contacts SW5–1 and SW6–1 thus deenergizing motor RM and energizing indicator light O3 through limiting resistor R24.

Offset O4 may be effected by energizing both offset control conductors 22 and 23. Relay coils CR13–C and CR12–C are energized and contacts CR13–1, CR12–1, and CR12–2 are transferred. A circuit will be completed through switch contacts SW7–1 and SW8–1. The circuit includes line L4, now-transferred contacts CR13–1, now-transferred contacts CR12–2, switch contacts SW7–1, switch contacts SW8–1 in either position, normally closed contacts CR8–1 or CR8–2, either winding of motor RM, and line L1. When switch contacts SW7–1 transfer they deenergize motor RM and energize neon indicator lamp O4 through limiting resistor R26.

A fifth offset is effected in a slightly different manner. This is necessary because it is desired that some controllers ignore the fifth offset if their switch SW11 is in the "Offset 5 Out" position. Switch SW11 is located on the face of the non-actuable unit N and has contacts SW11–1 in offset control line 34 shown at the bottom of FIGURE 6A. Relay coil CR8–C, FIGURE 5, may be energized through line 34 from the master controller to place offset O5 in effect. The circuit includes in FIGURE 6A, line 34 shown at the bottom of the figure, unit connector UC2–5, switch contacts SW11–1, jumper connector JC1–5, and in FIGURE 5, jumper connector JC1–5, line 34, relay coil CR8–C, and line L1.

When relay coil CR8–C is energized it transfers relay contacts CR8–1 and CR8–2 and switches the forward and reverse windings of motor RM from control by the first four sets of offset control switches to control by the fifth set of offset control switches. The new circuit includes line L4, switch contacts SW9–1 in the position shown in FIGURE 5, switch contacts SW10–1 in either position, now-transferred contacts CR8–1 or CR8–2, either winding of reversible motor RM, and line L1. Switch SW10–1 may be in either position depending on the position of offset control dial OS5. Switch SW10–1 is operated by a half cam which has one end of its rise located at the same point as the rise on the cam which operates switch SW9–1. Switch SW10–1 thus dwells in a position to energize either the forward or reverse winding of motor RM whichever requires the least distance or time to rotate the cam to actuate switch SW9–1. When switch contacts SW9–1 transfer they deenergize motor RM and energize neon indicator lamp O5 through limiting resistor R27.

Offset O5 is normally set at the same setting at each local controller. A common setting might be zero. When control conductor 34 is energized, each local controller seeks a zero offset relationship. That is, each local controller whose switch SW11 is in the "Offset 5 In" position, moves to get in step and then each operates in unison, or simultaneously. Simultaneous operation is desired in some cities under peak traffic conditions and is generally conceded to move large volumes of traffic expeditiously. A long traffic signal cycle may be called for at the same time so that thoroughfare traffic is permitted to move through a large number of intersections before it is required to stop for cross street traffic.

*Cycle length determination*

The circuits and apparatus employed to determine the duration of the potential traffic signal cycle are illustrated near the bottom of FIGURE 5. Variable speed motor VM is a synchronous motor and is employed to drive coordination dial CD and resynchronizing cam RC. Motor VM is operated normally from variable frequency power supplied over variable frequency line 20. Should the variable frequency source or amplifier AM fail, the motor VM is switched to 60 cycle local power supplied at line L4. The switching is done by failsafe relay contacts CR10–1 and free pick-up relay contacts CR14–1 and CR14–2.

Motor VM is normally operated from power supplied on line 20 from amplifier AM. Thef requency on line 20 may vary from 30 cycles per second to 120 cycles per second. The potential on line 20 may vary with frequency from approximately 90 volts to 145 volts. Motor VM is a synchronous motor designed to operate normally on 60 cycle power at 115 volts. It operates synchronously at 30 c.p.s. and 90 volts, through the complete range of frequencies, and continues to operate synchronously at 120 c.p.s. and 145 volts. The wave form supplied by amplifier AM is sinusoidal near the center of the range of frequencies and may deviate somewhat from sinusoidal near the ends of the range of frequencies. Amplifier AM is designed to supply a substantially constant current through its entire range of output frequencies.

While amplifier AM is operating properly it applies a direct current potential to unit connector UC1–16, FIGURE 5. The D.C. potential maintains failsafe relay coil CR10–C energized and keeps failsafe relay contacts CR10–1 normally open. The L4 circuit to free pickup relay coil CR14–C is normally interrupted and is closed only upon the failure of amplifier AM or its signal source.

While failsafe pickup relay coil CR14–C is deenergized, its contacts CR14–1 and CR14–2 remain in the position shown in FIGURE 5. The circuit to motor VM thus includes variable frequency amplifier AM, unit connector UC1–4, line 20, normally closed contacts CR9–1, contacts CR14–1 in the position shown in FIGURE 5, variable speed motor VM, and line L1.

Variable speed motor VM drives coordination dial CD, FIGURE 2, through gearing (not shown). Motor VM also drives resynchronizing cam RC at the same speed as dial CD. One revolution of dial CD causes keys K0 to operate contacts A′ and keys K1–K4 to operate the effective one of contacts B′–E′ to force timeout of the non-actuable unit N and actuated unit A, respectively, and time one complete potential traffic signal cycle. The speed of dial CD determines the duration of the potential cycle. The speed of dial CD is determined by the speed of motor VM which in turn is determined by the frequency of power supplied to line 20. The higher frequencies drive motor VM at higher speeds and cause shorter traffic cycle lengths. The lower frequencies drive motor VM at lower speeds and cause longer traffic signal cycles. The gearing between motor VM and dial CD is such that one complete potential traffic signal cycle is timed by 3600 cycles of incoming power. Table II below shows line frequencies and traffic cycle duration.

TABLE II

| Frequency on line 20, cycles per second | Potential traffic cycle duration, seconds per cycle |
|---|---|
| 120 | 30 |
| 102.9 | 35 |
| 90 | 40 |
| 80 | 45 |
| 72 | 50 |
| 65.5 | 55 |
| 60 | 60 |
| 55.4 | 65 |
| 51.4 | 70 |
| 45 | 80 |
| 40 | 90 |
| 36 | 100 |
| 32.7 | 110 |
| 30 | 120 |

*Loss of synchronism*

If for some reason a local controller gets out of synchronism with the master, the projection on resynchronizing cam RC closes contacts R′ while power is applied to line 21 by the master controller. Referring to the circuits illustrated near the bottom of FIGURE 5 it is evident that closure of contacts R′ results in the energization of resynchronizing relay coil CR9–C. The circuit includes line 21, contacts R′, relay coil CR9–C, and line L1.

When relay coil CR9–C is energized, contacts CR9–1 open and break the variable frequency line to variable frequency motor VM. The circuit formerly included line L20 from the variable frequency amplifier, contacts CR9–1, normally closed free pickup relay contacts CR14–1, motor VM, and line L1.

When contacts CR9–1 open they place rectifier DR5 in the variable frequency line. The rectifier supplies half wave rectified power to motor VM thereby stalling it and holding it against counter rotating torque supplied by the offset controlling motor RM. Dial CD is thus stopped until resynchronizing power is interrupted by the master controller. When power is interrupted, relay coil CR9–C becomes deenergized, and contacts CR9–1 close and apply full variable frequency power to motor VM. The local controller then starts in synchronism with the master.

*Failsafe operation*

To minimize the chance of the controller disrupting traffic flow if one or more interconnections with the master fail, it is required that the controller continue to operate after an interconnection failure.

Failure of the variable frequency source, interconnecting circuits, or amplifier, for example, should not cause the local controller to stall. Loss of one or more of the interconnecting circuits causes the controller to operate at whatever split or offset is demanded by the remaining interconnecting conductors. Loss of both split control conductors results in the local controller assuming split S1. Loss of the offset conductors results in the local controller assuming offset O1. Loss of the variable frequency source or amplifier will cause the local controller to operate free of the master controller. The term failsafe is employed to define the faculty of the local controller to operate free of the master controller should the variable frequency signal source or amplifier fail.

During failsafe operation the local controller dwells with the right of way signals illuminated to thoroughfare traffic and the stop signals illuminated to the cross street. Actuation of the cross street detectors or pushbuttons causes the controller to time and display a cross street right of way period. After a time determined by the amount of cross street traffic, right of way is returned to the thoroughfare. This is also the mode of operation during free or non-coordinated operation.

If it were desired, the controller could be made to operate on a 60 second cycle during failsafe operation. The local controller would remain coordinated with the master controller only if the variable frequency source in the master had also failed and the master controller had also assumed a 60 second cycle. If, however, the variable frequency amplifier in the local controller failed, the local controller would not remain in step with the master. For this reason the local controller is designed to be forced to free operation.

Dial CD is operated on 60 cycle power during failsafe and free operation so that a change in offsets will not cause counter rotation of dial CD. If motor VM were deenergized and dial CD allowed to dwell, a change in offset could cause reverse rotation of dial CD and possible damage to contacts A′–E′ and B″–E″ and to keys K0, K1–K4. Thus, 60 cycle power is applied to motor VM to cause it to rotate and prevent counter rotation. Its keys and contacts are made electrically ineffective, however, as will be explained below.

When variable frequency power is lost, failsafe D.C. power normally applied to unit connector UC1–16 from amplifier AM is no longer available. Failsafe relay coil CR10–C is deenergized and contacts CR10–1 close. L2 power flows to free pickup relay coil CR14–C and to failsafe indicator lamp FS. Contacts CR14–1 transfer and complete a circuit from line L4 through unit connector UC1–20 to motor VM. Motor VM thus operates on 60 cycle power and rotates dial CD one revolution each 60 seconds. The dial has no control over the non-actuable unit N or the actuable unit A. The controller operates free with right of way maintained on the thoroughfare until a cross street detector actuation. The actuated phase unit A may obtain right of way for up to a maximum time determined by a maximum timer located in unit A. After the maximum interval right of way is returned to the thoroughfare for at least a minimum interval.

Free pickup relay contacts CR14-2 also transfer when relay coil CR14-C is energized. When contacts CR14-2 transfer they apply steady L4 power to the free relay coil CR3-C in non-actuable unit N, FIGURE 6A. The circuit includes in FIGURE 5, line L4, unit connector UC1-20, now-transferred contacts CR14-2, and jumper connector JC1-10. In FIGURE 6A the circuit includes jumper connector JC1-10 shown near the bottom of the figure, free relay coil CR3-C, and line L1.

The transfer of contacts CR14-2 breaks the free control circuit from the master controller. This includes in FIGURE 6A, unit connector UC2-4, free control switch SW13-1, and jumper connector JC1-9, and in FIGURE 5, jumper connector JC1-9, contacts CR14-2 in the condition shown, and jumper connector JC1-10. In FIGURE 6A the circuit includes jumper connector JC1-10, free relay coil CR3-C, and line L1. This circuit prevents the failed controller from feeding L4 power back on the free control interconnecting conductor and causing the remainder of the controllers to go to free operation.

*Free operation*

Referring to FIGURE 6A, when free relay coil CR3-C is energized, contacts CR3-3 and CR3-4 transfer and disconnect the maximum timeout contacts B'-E' and B''-E'', FIGURE 5, from the one or more actuable units A. Contacts CR3—3 also bridge unit connectors UC2-17 and UC2-18. In the terminal rack R, unit connector UC2-17 of the non-actuable unit N is jumpered to unit connector UC2-17 of the actuable unit A. Unit connector UC2-18 of the non-actuable unit N is jumpered to unit connector UC2-18 in actuable unit A. In unit A, shown in part in FIGURE 10, the bridging of unit connectors UC2-17 and UC2-18 connects the maximum timing plate circuit to both the normal timing relay coil CR5-C and the memory relay coil CR2-C. Thus, during failsafe operation the actuable unit A is disconnected from control by maximum timeout contacts B'-E' and is connected to its own maximum interval timer. The actuable unit A is thereby freed from control by coordination dial CD.

If a second actuable unit is used it is also freed from control by cordination dial CD through the action of contacts CR3-4, FIGURE 6A. During failsafe operation, contacts CR3-4 transfer as described above and disconnect both the normal timing plate circuit relay coil CR5-C and the memory relay coil CR2-C from the circuit through maximum timeout contacts B''-E'', contacts CR7-2, and jumper connector JC1-2, FIGURE 5. This permits the second actuable unit to time after the first actuable unit, each free of control from coordination dial CD.

During failsafe operation and non-actuable unit N is also disconnected from control by maximum timeout contacts A' on coordination dial CD. Relay contacts CR3-2 shown near the top of FIGURE 6A transfer and complete a circuit to the plate of normal timing tube V4 through line L11 and the step switch when in position 3, its green dwell position. The circuit derives L1 power from the actuated unit A through unit connector UC1-3 shown at the top of FIGURE 5, and applies it through jumper connector JC1-6, FIGURES 5 and 6, through the step switch arm A8, through the step switch contact on bank 8 at position 3, through line L11, through now-transferred free relay contacts CR3-2, FIGURE 6A, through step switch contacts CR1-INT-C, through now-transferred stop timing relay contacts CR4-1, and the normal timing plate circuit relay coil CR2-C, to the plate of tube V4.

During failsafe operation free relay contacts CR3-1, FIGURE 6A, also transfer. In positions 2 and 3 of the step switch, contacts CR3-1 connect the minimum green timing circuit including potentiometer R9 to the control grid of normal timing tube V4. The circuit includes the 105 v. source applied to unit connector UC2-6, the left hand portion of minimum thoroughfare green potentiometer R9, line L17, now-transferred contacts CR3-1, line L15, and in FIGURE 6, line L15, step switch contacts in positions 2 and 3, step switch arm A7, line L7, line L6, and in FIGURE 6A, line L6, resistor R6, line L12, and the right hand side of timing capacitor C1. The left hand side of capacitor C1 is applied to the grid of tube V4 through grid resistor R3. The non-actuable unit N thus times itself during its minimum green intervals. The minimum green interval is divided into two positions of the step siwtch so that half of the interval may be timed during each position. This increases the accuracy of the R-C timing circuit and permits a small saving in component costs.

During failsafe operation a neon indicator lamp FS on the face of the coordinating unit C is illuminated. The circuit is shown in FIGURE 5 and includes line L4, now-closed failsafe relay contacts CR10-1, limiting resitor R28, neon indicator lamp FS, and line L1.

The remaining items on FIGURE 5 consist of jumper connector JC1-7 and unit connector UC1-7, jumper connector JC1-11 and unit connector UC1-22, and jumper connector JC1-12 and unit connector UC1-21. These three connections are necessary because there are insufficient connector pins between non-actuable unit N and rack R. These connections will be explained in the section describing the non-actuable unit N.

NON-ACTUABLE TIMING UNIT

The coordinating unit C described immediately above is designed to operate in conjunction with the non-actuable timing unit N and with one or more actuable units A. One such arrangement is shown in FIGURE 2. The non-actuable timing unit N is located below the coordinating unit. Unit N consists essentially of an electronic interval timer employing a step switch and a series of resistance-capacitance timing circuits applied in sequence to the control grid of a thyratron. The unit normally dwells in an interval which permits the display of a right of way signal to the thoroughfare. It can be urged from that position by the coordinating unit C after an actuation of one of the cross street detectors.

A circuit diagram for the preferred form of the non-actuable unit N is shown in line to line form in FIGURES 6 and 6A. The step switch is illustrated in FIGURE 6 and the thyratron and associated timing circuits are shown in FIGURE 6A. The figures may be placed together, side by side, with FIGURE 6 on the right, to obtain the complete circuit configuration.

Referring more particularly to FIGURE 6, the step switch is shown to consist of nine contact banks, each bank containing eleven contacts or positions. Each bank has a stepping contact or arm A1-A9 shown near the right hand side of the figure. The first five banks have shorting type contacts indicated by the double arrows. The shorting type contacts, when stepping, make circuit with the next contact before breaking circuit with the previous contact. The last four banks have non-shorting contacts indicated by the single arrow. The step switch is shown in its red dwell 2 position, position 11. The stationary contacts are arranged in a 120 degree arc. The stepping contacts or arms A1-A9 each are made up of three fingers spaced 120° apart. The fingers shown at position 11 will next move to the right and another group of fingers will approach from the left and move to position 1 at the left hand side of the diagram. The stepping contacts or arms A1-A9 will subsequently move to the right through positions 1 through 11.

The spring driven stepping switch in the preferred form of the invention is Type 11 shown in C. P. Clare and Company Sales Engineering Bulletin No. 121 (Temporary) FIGURE 1.

The step switch actuating coil CR1–C is shown near the center of FIGURE 6A. When coil CR1–C is energized it attracts an armature (not shown) which compresses an operating spring (not shown) and when deenergized permits the compressed operating spring to step the stepping arms A1–A9 one position. While coil CR1–C is energized it transfers the three sets of interrupter contacts CR1–INT–A, CR1–INT–B, and CR1–INT–C. The contacts are of the A type, B type, and C type, respectively, as such designations are used in the industry.

Contacts of the A type are normally open and close upon actuation. Contacts of the B type are normally closed and open upon actuation. Contacts of the C type are double throw and transfer upon actuation. This is the conventional nomenclature for contact stacks. The interrupter contacts are shown in a column above and below coil CR1–C.

The step switch is equipped also with "off normal" contacts CR1–A, CR1–B. These are auxiliary contacts operated by a cam on the same shaft as the stepping contacts. Their function is limited to operation in only one position of the step switch. Contacts CR1–A are normally open and are closed when the step switch is in position 3. Contacts CR1–B are normally closed and are opened when the step switch is in position 3.

The timing mechanism illustrated in FIGURE 6A consists of the normal timing tube V4, its plate circuit relay coil CR2–C, stop timing relay contacts CR4–1 and CR4–2; the "free" relay contacts CR3–2, timing capacitor C1, and timing resistors and potentiometers R1–R9. Additional timing potentiometers R10–R14 and resistors R19, R20 are shown in FIGURE 6.

Each of the intervals timed by the non-actuable unit N is timed by an individual resistance-capacitance circuit connected individually in sequence to the control grid of tube V4. Capacitor C1 is recharged to a floor value during the short time that the step switch coil CR1–C is energized and the interrupter contacts CR1–INT–A and CR1–INT–C are transferred. The recharging circuit includes two paths between line L4 and the left hand side of capacitor C1, and one path between the right hand side of capacitor C1 and line L1. One recharging path includes line L4, contacts CR1–INT–A when closed during energization of step switch coil CR1–C, rectifier DR2, limiting resistor R4, and the left hand side of capacitor C1. A parallel recharging path includes line L4, the cathode of tube V4, the control grid of tube V4, grid resistor R3, and the left hand side of capacitor C1. The remainder of the recharging path includes the right hand side of capacitor C1, contacts CR1–INT–C when transferred, line L10, and in FIGURE 6, line L10, contacts on bank 9 in positions 1, 2, 4, 5, 6, 7, and 9, stepping switch arm A9, jumper connector JC1–13 and line L1. Thus, while the step switch actuating coil CR1–C is energized and interrupter contacts CR1–INT–A and –C are transferred, power flows through the circuit components enumerated immediately above and recharges capacitor C1.

It is apparent that the cathode to grid circuit within tube V4 acts as a rectifier and permits current to flow only when the grid is positive with respect to the cathode. That is, current flows to capacitor C1 only during the half cycles of 60 cycle alternating line voltage when line L1 is positive with respect to line L4. During alternate half cycles no current can flow because of the high back impedance of the cathode to grid circuit.

The same is true for the portion of charging circuit through contacts CR1–INT–A. Rectifier DR2 is connected so that current will flow through it only when line L1 is positive with respect to line L4.

A constant discharge circuit is applied across capacitor C1. The discharge circuit includes resistor R1 and potentiometer R2. The electric charge stored on the left hand side of capacitor C1 discharges through the circuit provided by resistor R1 and potentiometer R2 to the right hand side of capacitor C1. The rate of discharge through this path is low, however.

Adjustments in timing for the various intervals are made by introducing a variable A.C. potential in series with the right hand side of capacitor C1. This varies the potential of the capacitor and makes the left hand side appear to be alternately more and less negative. The resultant potential appearing at the grid of tube V4 consists of the capacitor's decay potential with the small sinusoidal alternating potential superimposed on it. When the resultant voltage becomes less negative than the firing potential of the tube, tube V4 conducts.

The variable A.C. potentials are supplied by timing potentiometers R9–R14 and resistors R19, R20. Potentiometers R9–R14 each have one end of their winding connected to the 105 volt power supply 105 v. and the other end of their winding connected to line L1. The movable potentiometer taps are connected to individual contacts on bank 7 at positions 2, 3, 6, 7, 8, 9, and 1, respectively.

Resistors R19, R20 are connected in series as a voltage divider between the 105 volt power supply 105 v. and line L1. The voltage appearing at their mid-connection is applied to step switch contacts on bank 7 at positions 4 and 5. When free relay contacts CR3–1 are in the position shown in FIGURE 6A, the potential appearing at their mid-connection is also applied to step switch contacts on bank 7 at positions 2 and 3. The circuit includes the midpoint of resistors R19, R20 and line L16 in FIGURE 6, line L16, contacts CR3–1 in the position shown in FIGURE 6A, and line L15 in FIGURE 6A, and line L15 and contacts at bank 7, positions 2 and 3, FIGURE 6.

The tap of potentiometer R14 is connected to the contact at position 1 of bank 7, and serves to time the special clearance interval. The tap of potentiometer R10 is connected to the contact at position 6 of bank 7, and times the vehicle clearance interval 1. The tap of potentiometer R11 is connected at position 7 and times the trailing green interval. The tap of potentiometer R12 is connected at position 8 and times the phase overlap and second pedestrian clearance interval. The tap of potentiometer R13 is connected at position 9 and times the second vehicle clearance interval.

Three of the above named intervals are usually of short duration and require auxiliary aid to rapidly reduce the negative potential appearing at the left side of capacitor C1 and at the control grid of tube V4. During the special clearance interval, position 1, and the vehicle clearance intervals 1 and 2, positions 6 and 9, respectively, an auxiliary discharge path is connected across capacitor C1. The auxiliary discharge path includes the left hand side of capacitor C1, resistor R8, potentiometer R5, line L13, and in FIGURE 6, line L13, any one of the contatcs on bank 6 at positions 1, 6, or 9, stepping arm A6, line L6, and in FIGURE 6A, line L6, resistor R6, a portion of line L12, and the right hand side of capacitor C1. This circuit is in parallel with the continuously effective discharge circuit through resistor R1 and potentiometer R2 and with the A.C. dropping potential derived from potentiometers R14, R10, or R13. Since the two paths which include resistors R1 and R8 are of approximately the same order of magnitude, the discharge time is reduced to somewhat more than one half. The setting on dials VC1, VC2, and SC1, FIGURE 2, controls the duration of these clearance intervals.

Resistor R7 is placed in parallel with the various timing potentiometers to make the dials controlling same more linear at the longer time settings. Resistor R7 is connected to the 105 volt source at unit connector UC2–6 and through a portion of line L12 to the right hand side of capacitor C1. Resistor R7 is in the circuit at all times and is effective during all timing intervals.

The source of 105 volts potential applied to unit connector UC2–6 consists of a transformer having its primary connected across lines L1 and L4 and its secondary connected between line L4 and unit connector UC2–6.

The secondary voltage of the transformer is 12 volts. A twelve volt reduction from the nominal line voltage of 117 volts results in a working voltage of 105 volts. This is an improvement over prior art devices which employed a dropping resistor with its encumbent power loss and heat dissipation problems.

*Circuit operation*

The operation of the non-actuable unit N will now be described through its entire cycle. The eleven positions of the step switch and the intervals timed and controlled thereby are as follows:

TABLE III

| Step Switch Position | Interval | Timing Dial | Resistor, Potentiometer, or Dial CD |
|---|---|---|---|
| 1 | All red clearance or advance green. | Special Clearance SC1 | R14. |
| 2 | Minimum green to maximum green. First half of interval. | Green 1 during free operation. G1. | R9 during free operation. |
| 3 | Minimum green and swell. Second half of interval. | do | R9 during free operation. Dial CD. |
| 2, 3 | Walk interval 1 | do | Do. |
| 4 | Skip | None | R19, R20. |
| 5 | Pedestrian clearance 1 | Not normally available | R19, R20. |
| 6 | Vehicle clearance 1 | Vehicle Clearance 1 VC1 | R10. |
| 7 | Trailing green | Green 2 G2 | R11. |
| 8 | Pedestrian clearance 2 and phase select. | Pedestrian Clearance PC2 | R12. |
| 9 | Vehicle clearance 2 | Vehicle Clearance 2 VC2 | R13. |
| 10 | Red dwell 1 | | |
| 11 | Red dwell 2 | | |

The non-actuable unit N normally dwells in its minimum green dwell interval with the step switch resting in position 3. During non-coordinated or free operation the unit may be stepped out of its dwell position by actuation of a detector on the actuated phase. The stepping does not take place until after the non-actuable unit has timed a minimum right of way interval to the thoroughfare. During coordinated operation the unit may also be urged from its dwell position by actuation of a detector on the actuated phase. However, the step switch does not move from its green dwell position until coordination dial CD has completed timing the minimum right of way period to the thoroughfare.

Thus, two conditions must always be present before the non-actuable unit can leave its green dwell position:

(1) The minimum right of way interval for the thoroughfare must have been completed, and (2) A traffic actuation must have occurred on the actuable phase or the memory circuit in the actuated unit must indicate that the previous actuated phase right of way period was interrupted before a time sufficient to permit all vehicles to pass.

The circuits of FIGURES 6 and 6A will now be described functionally as the non-actuable unit N times through a cycle of operation.

Assume that the controller is operating coordinated with the master controller and that unit N is dwelling in step switch position 3 and that an actuation of one of the cross street detectors D1–D4, FIGURE 1, has occurred. Actuation of one of the cross street detectors results in the energization of the detector relay coil CR1–C in unit A, and in subsequent energization of detector memory relay coil CR2–C and closure of contacts CR2–3, FIGURE 7. Closure of the detector memory relay contacts CH2–3 results in the application of L1 power to unit connector UC1–3 shown at the top of FIGURE 5. L1 power is thus available at the top contact of normally open contact pair A′ located adjacent to the coordination dial CD in the coordinating unit C. When dial CD rotates sufficiently that dial key K0 closes contacts A′, L1 power is applied to jumper connector JC1–3. Jumper connector JC1–3 of the coordinating unit C connects with jumper connector JC1–3 of the non-actuable unit N shown near the top of FIGURE 6A. Contacts CR1–A are off-normal contacts and are closed when the step switch is in position 3. The plate circuit of normal timing tube V4 is thus completed. The circuit includes jumper connector JC1–3, now closed contacts CR1–A, free relay contacts CR3–2 in the position shown, contacts CR1–INT–C in the position shown, contacts CR4–1 in the transferred position shown, normal timing relay coil CR2–C, and the plate of tube V4.

The potential on the control grid of tube V4 has already been made sufficiently less negative to permit tube V4 to conduct. Tube V4 therefore conducts and energizes its plate circuit relay coil CH2–C.

Contacts CR2–1 close and apply power from line L1 to the step switch actuating coil CR1–C. The other side of coil CR1–C is permanently connected to line L4 through rectifier DR4. When the step switch coil CR1–C is energized its first operates the interrupter contacts CR1–INT–A, B, and C.

Interrupter contacts CR1–INT–C transfer and contacts CR1–INT–A close and thereby complete the recharging circuit for capacitor C1 through off normal contacts CR1–A and coordinating contacts A′. The path includes line L4, now-closed contacts CR1–INT–A, rectifier DR2, limiting resistor R4, capacitor C1, now-transferred contacts CR1–INT–C, free relay contacts CR3–2 in the position shown, now-closed contacts CR1–A, and jumper connector JC1–3. In unit N, FIGURE 5, the circuit includes jumper connector JC1–3, coordinating contacts A′, and a line to unit connector UC1–3 which has L1 power applied to it when unit A has been traffic actuated. The above circuit is employed to recharge capacitor C1 only between intervals 3 and 4.

When contacts CR1–INT–C transfer they interrupt the plate circuit of tube V4 and deenergize relay coil CH2–C. Contacts CR2–1 open and deenergize step switch coil CR1–C. The step switch operating spring steps the stepping arms A1–A9 from position 3 to position 4. Thus, during coordinated operation the non-actuable phase unit is moved out of its green dwell position 3 by the closure of coordination dial contacts A; after a detector actuation on the actuated phase.

The non-actuable unit N remains in position 4 for only a very short time. The duration of the interval is determined by the relative value of the resistors R19 and R20 in the voltage divider circuit. During step switch position 4 and while line L1 and the plate of tube V4 are positive with respect to line L4, a negative voltage derived from the 105 volt source and appearing at the mid-point of the voltage divider R19, R20 is detected by arm A7 and applied through line L7 and line L6 to the right hand side of timing capacitor C1 through blocking resistor R6. The application of a negative voltage to the right hand side of capacitor C1 decreases the potential of capacitor C1 and makes its left hand side appear less negative or more positive. The less negative potential appears at the grid of tube V4 and causes tube V4 to conduct.

When tube V4 conducts, it energizes the normal timing plate relay coil CR2–C through the circuit shown at the top of FIGURES 6A and 6. The circuit includes the plate of tube V4, normal timing relay coil CR2–C, contacts CR4–1 in the position shown in FIGURE 6A, contacts CR1–INT–C in the position shown, line L10, and in FIGURE 6, line L10, the contact at position 4 of bank 9 stepping arm A9, jumper connector JC1–13, and line L1. Energization of relay coil CR2–C results in the closure of contacts CR2–1 as outlined above. Closure of contacts CR2–1 results in the energization of the step switch coil CR1–C. When the step switch coil is energized it operates interrupter contacts CR1–INT–A, –B, and –C.

When contacts CR1–INT–A close and CR1–INT–C transfer they complete the normal charging path for timing capacitor C1. The circuit includes line L4, now-closed contacts CR1–INT–A, rectifier DR2, limiting resistor R4, capacitor C1, now-transferred contacts CR1–INT–C, line L10, and in FIGURE 6 line L10, contacts at positions 1, 2, 4, 5, 6, 7, and 9 of bank 9, stepping arm A9, jumper connector JC1–13 and line L1. During the half cycles of potential when line L1 is positive with respect to line L4, rectifier DR2 permits capacitor C1 to charge. The left hand side of capacitor C1 receives a negative charge while the right hand side receives an apparent positive charge.

The operation of interrupter contacts CR1–INT–C also breaks the plate circuit which causes normal timing relay coil CR2–C to become deenergized. Rectifier DR1 is provided in parallel with coil CR2–C to sustain the current through coil CR2–C as its magnetic field collapses. This assures chatter-free relay operation.

When relay coil CR2–C is deenergized, its contacts CR2–1 open and deenergize step switch coil CR1–C. The step switch operating spring moves stepping arm A1–A9 to position 5.

The action described immediately above occurs once again to move the step switch from position 5 to position 6. The pedestrian clearance 1 interval is not used in the present embodiment of the invention and its timing potentiometer is omitted. The contact at position 5 of bank 7 is bridged to the contact at position 4. In another embodiment a timing potentiometer similar to potentiometers R10–R14 may be employed to time the pedestrian clearance 1 interval.

In position 6, timing potentiometer R10 is effective in conjunction with the series combination of the short timing resistor R8 and potentiometer R5 to limit the duration of the vehicle clearance 1 interval. During the half cycles of alternating line potential when line L1 is positive with respect to line L4 a negative potential is applied to the right hand side of capacitor C1 through potentiometer R10. The circuit is similar to that described immediately above except that the short timing resistor R8 and potentiometer R5 are in parallel with timing potentiometer R10.

The timing circuit therefore includes line L1, the right hand side of potentiometer R10, the tap of potentiometer R10, a contact in position 6 of bank 7, stepping arm A7, line L7, line L6, and in FIGURE 6A line L6, resistor R6, a portion of line L12, and the right hand side of capacitor C1.

During the clearance intervals which are normally of short duration the previously described parallel discharge path is also in effect. The discharge path includes the left hand side of capacitor C1, resistor R8, potentiometer R5, line L13, and in FIGURE 6 line L13, a contact in position 6 of bank 6, stepping arm A6, and line L6. In FIGURE 6A the remainder of the circuit includes line L6, coupling resistor R6, a portion of line L12, and the right hand side of capacitor C1. The impedance of this short timing circuit is of the same order of magnitude as the normal discharge circuit including resistor R1 and potentiometer R2. Capacitor C1 therefore discharges relatively rapidly. This, in conjunction with the negative voltage applied to the right hand side of capacitor C1 through timing potentiometer R10, times the vehicle clearance 1 interval.

When the voltage appearing at the left hand side of capacitor C1 and thus at the grid of tube V4 becomes sufficiently less negative to permit tube V4 to conduct, normal timing relay coil CR2–C is energized and contacts CR2–1 are closed. Closure of the latter contacts admits L1 power to the step switch coil CR1–C which operates interrupter contacts CR1–INT–C. Transfer of contacts CR1–INT–C completes the recharging circuit for capacitor C1 and also breaks the plate circuit of tube V4. Capacitor C1 is recharged and the step switch coil is deenergized. The operating spring moves arms A1–A9 from position 6 to position 7. The non-actuable unit N starts to time the green 2 interval.

The green 2 interval is illustrated in FIGURE 3 as being the second to last portion of the trailing green period. Interval 7 also times the WALK 2 period durinb which one or more WALK signals continue to be illuminated after the normal WALK 1 signals are extinguished. The duration of this interval is determined by the setting of potentiometer R11. When the potential appearing at the left hand side of capacitor C1 becomes sufficiently less negative to permit tube V4 to conduct, tube V4 fires and energizes the normal timing relay coil CR2–C. The negative voltage applied to the right hand side of capacitor C1 is determined by the setting of potentiometer R11. The circuit includes components in FIGURE 6 consisting of the 105 v. source, the left hand portion of potentiometer R11, the tap of potentiometer R11, a contact in position 7 of bank 7, stepping arm A7, line L7, and line R6. In FIGURE 6A the circuit includes line L6, coupling resistor R6, a portion ofline L12, and the right hand side of capacitor C1.

When the step switch coil CR1–C is energized it operates interrupter contacts CR1–INT–C which completes the recharging circuit and breaks the plate circuit of tube V4. Relay coil CR2–C becomes deenergized and opens contacts CR2–1. Opening of contacts CR2–1 deenergizes step switch coil CR1–C and permits the operating spring to move the stepping arms from position 7 to position 8. Capacitor C1 is recharged and in step switch position 8 the timing circuits cause the pedestrian clearance 2 interval to time. The duration of the pedestrian clearance 2 interval is determined by the setting of potentiometer R12.

The pedestrian clearance 2 interval, step switch position 8, serves also as a phase select interval. The phase selection function is important when two or more actuable units A are employed, but is less important when only one actuable unit is used. The circuit determines which actuated unit will next time the right of way movement.

When only one actuable unit is employed this is no problem but with more than one actuable unit it is necessary that phase selection be accomplished during this interval so that an overlapping signal sequence may be timed if desired. An overlapping phase or signal is one which is illuminated during two or more phase movements.

If an overlapping phase is normally timed with the non-actuable phase and with phase B, for example, and if actuable unit A has received a detector actuation, it is obvious that the N+B overlapping phase right of way signal should be terminated and its caution signal illuminated.

Within the circuitry of the instant invention the unit doing the timing does not know which unit will next gain control. However, the unit gaining control knows that it is being given control because it is stepped to its red dwell 2 position. In that position it controls the amber signal for the overlapping phase which is not a part of the next phase. The unit which is presently timing determines the duration of the caution interval and the unit gaining control determines which phase will receive the caution signal.

Because phase overlap is not employed at a two phase intersection and because the phase select feature is less important in a two phase controller than in a multiphase controller, these features are not fully explained in the instant specification.

The phase select circuit thus assumes its simplest form in a two phase controller. It is included only because all actuable units must be compatible. The phase select circuit is very important when two or more actuable units are employed, as at a three phase intersection.

The function of the non-actuable unit N during the phase select interval is to enable the phase select circuit to determine which unit will next gain control.

Figure 8:
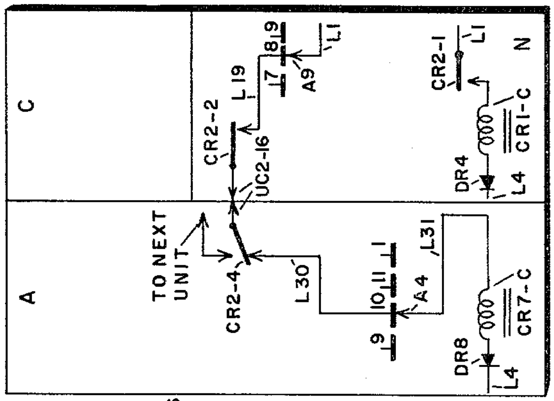

The phase select circuit consists of a series or cascade circuit which originates in unit N, and connects through unit A and then through additional units and ends in the last unit. In the embodiment of the invention illustrated, the circuit originates in unit N, and connects through and terminates in unit A. This is shown in FIGURE 8.

During the phase select interval the cascade mentioned above is partially completed to the unit which has been traffic actuated. The circuit consists of line L1 available at jumper connector JC1–13, FIGURE 6, stepping arm A9, a contact in position 8 of bank 9, line L19, and in FIGURE 6A, line L19, normal timing relay contacts CR2–2 when closed, and unit connector UC2–16. Since unit A has been traffic actuated, the circuit is as shown in FIGURE 8 and includes unit connector UC2–16, transferred memory relay contacts CR2–4, line L30, a contact in position 10 of step switch bank 4, stepping arm A4, line L31, step switch coil CR7–C, rectifier DR8, and line L4. The circuit is completed in unit N at the end of interval 8 when the normal timing relay contacts CR2–2 are closed when tube V4 conducts. Detector memory relay contacts CR2–4 in actuated unit A were transferred to the position shown when a detector actuation was registered on phase A.

It will be noted in FIGURE 6 that the normal timing plate circuit and the normal recharging circuit are connected differently in step switch position 8 than in positions 1, 2, 4, 5, 6, 7, and 9. Stepping arm A9 no longer supplies L1 power to the plate circuit of tube V4 but supplies energizing power to the step switch in the traffic actuated unit A. Stepping arm A8 receives L1 power from actuated unit A and applies it to the plate circuit to tube V4. L1 power for the normal recharging circuit is also derived from stepping arm A8 and actuated unit A.

The complete recharging circuit includes in FIGURE 6A line L4, now-closed contacts CR1–INT–A, rectifier DR2, resistor R4, capacitor C1, now-transferred contacts CR1–INT–C, line L10, and in FIGURE 6 line L10, a contact at position 8 of bank 8, stepping arm A8, and jumper connector JC1–6. In unit C, FIGURE 5, the circuit includes jumper connector JC1–6, and a line to unit connector UC1–3. The actuated unit applies L1 power to unit connector UC1–3 after it has been traffic actuated.

When unit N completes timing the pedestrian clearance 2 and phase select interval, the reduced potential on capacitor C1 permits tube V4 to conduct and energize normal timing relay coil CR2–C. Normal timing relay contacts CR2–2 close and complete the series circuit to the step switch coil CR7–C in actuated unit A, FIGURE 8. At the same instant, normal timing relay contacts CR2–1 also close and energize the step switch coil CR1–C in non-actuable unit N. Therefore, both units step forward one position simultaneously. The non-actuable unit N moves to position 9 and times the vehicle clearance 2 interval. Actuated unit A moves to position 11 and energizes the phase overlap control circuit. This circuit is used in a multiphase controller and is described in greater detail in the patent application named immediately above. Its purpose is to control the energization of the proper phase overlap signals. The duration of the signal interval is timed by unit N, but unit A controls the load relays and signals which are timed by unit N, as explained above.

In the vehicle clearance 2 interval, potentiometer R13, shown in FIGURE 6, determines the duration of the interval. Since this is a clearance interval the short time resistor R8 and potentiometer R5 are included in the timing circuit. This auxiliary discharge path aids resistor R1 and potentiometer R2 in discharging capacitor C1.

The vehicle clearance 2 interval is completed when the potential on the left hand side of capacitor C1 is no longer sufficiently negative to prevent tube V4 from conducting. Tube V4 conducts and energizes the normal timing relay coil CR2–C. Closure of contact CR2–1 permits power to flow to the step switch coil CR1–C and energize the step switch coil. Contacts CR1–INT–C operate to break the plate circuit and deenergize relay coils CR2–C and CR1–C. The step switch moves to position 10, the red dwell 1 interval. There the non-actuable unit N resides until the actuated unit times out or is forced out by the maximum timeout circuits described in conjunction with coordinating unit C.

While unit N was stepping from position 9 to position 10, actuated unit A was stepped from position 11 to position 1. The circuit governing this dual stepping is illustrated in FIGURE 9. L1 power is made available to stepping arm A8 from a circuit including actuated unit A and coordinating unit C. The circuit begins at line L1 shown near the top of the rectangle representing actuated unit A, FIGURE 9 and includes line L1, stepping arm A8, a contact at position 11 of bank 8, unit connector UC1—6, a jumper between unit connectors US1–6 and UC1–7, now closed detector memory relay contacts CR2–3 and unit connector UC2–2. A line in rack R and in coordinating unit C joins the latter connector to jumper connector JC1–6 in non-actuable unit N. In non-actuable unit N, the circuit includes jumper connector JC1–6, a line to stepping arm A8, a contact at position 9 of bank 8, line L18, normal timing relay contacts CR2–3 when closed. and unit connector UC2–13. In unit A the circuit includes unit connector UC2–13, line L32, a contact at position 11 of bank 4, stepping arm A4, line L31, set switch coil CR7–C, rectifier DR8, and line L4.

Thus, when normal timing relay contacts CR2–3 in unit, N, FIGURE 6A, close at the end of the vehicle clearance 2 interval, an L1 circuit is completed to the step switch coil CR7–C in actuated unit A. Normal timing relay contacts CR2–1, FIGURE 6A, close simultaneously and energize step switch coil CR1–C in unit N. The step switches in both units step in unison, unit N stepping from position 9 to position 10, and unit A stepping from position 11 to position 1. The non-actuable unit N dwells in its red dwell 1 position and actuated unit A begins to time the right of way movements to phase A.

Unit N dwells in its red dwell 1 position until actuated unit A times out due to lack of detector actuations or due to closure of the effective one of maximum timeout contacts B′–E′ for unit A.

It will be noted in FIGURE 6 that unit N is provided with no timing potentiometer in position 10. Likewise, line L10 which normally completes the plate circuit of the tube V4 is incomplete during position 10. In positions 10 and 11, line L5 from stepping arm A5 completes the circuit to the step switch coil CR1–C. In position 10, L1 power arrives from unit connector UC2–23 or UC2–24 depending upon whether the device is used as a 2 phase controller or as a 3 phase controller. When used as a 2 phase controller L1 power arrives at unit connector UC2-23 and flows through switch SW14–1 in the positon shown in FIGURE 6 and is applied to a step switch contact at position 10 of bank 5. L1 power available at this contact flows through stepping arm A5, line L5, step switch coil CR1–C, rectifier DR4, and line L4. This takes place only when the actuated unit has completed timing its phase select interval.

For 3 phase operation switch SW14–1 is thrown to its other position so that L1 power arriving at unit connector UC2–24 may be applied through a contact at position 10 of bank 5, through stepping arm A5, and line L5 to the step switch coil CR1–C.

Figure 12:
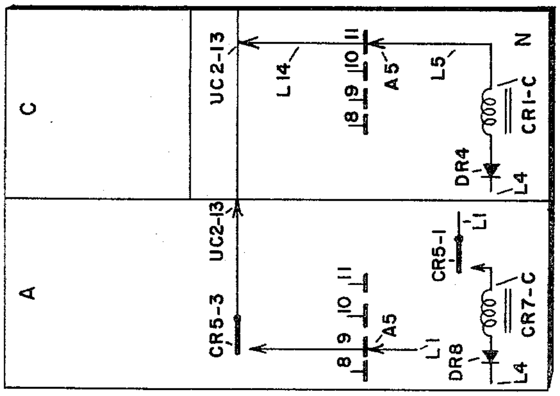

In position 11, L1 power reaches the step switch coil CR1–C through stepping arm A5, a contact at position 11 of bank 5, line L14, and unit connector UC2–13. L1 power is available at unit connector UC2–13 from unit connector UC2–13 in unit A when the unit completes timing its vehicle clearance interval, step switch position 9. This is illustrated in FIGURE 12.

When the actuated unit times out and return control to the non-actuable unit, the circuits function similarly to that described above. That is, when the actuated unit reaches step switch position 8 and interval 8 times out, the non-actuable unit is moved from position 10 to position 11 at the same time that the actuated unit moves from position 8 to position 9. Again, as the step switch in the actuated unit moves from position 9 to position 10, it energizes the step switch in the non-actuable unit and moves it from position 11 to position 1.

The red dwell 2 interval, step switch position 11, is timed by actuated unit A and is not timed by unit N. Therefore, a different recharging path is used for recharging the timing capacitor C1. The path includes in FIGURE 6A line L4, the cathode of tube V4, the control grid of tube V4, grid resistor R3, the left hand side of capacitor C1, the right hand side of capacitor C1, line L12, and in FIGURE 6 line L12, a step switch contact at position 11 of bank 8, stepping arm A8, line L8, a contact at positon 11 of bank 9, stepping arm A9, jumper connector JC1–13, and line L1. When line L1 and the control grid of tube V4 are positive with respect to line L4 and the cathode of tube V4, the grid draws current which is used to charge capacitor C1. Capacitor C1 charges during the red dwell 2 interval so that it will be ready to time the next interval, the advance green interval.

In step switch position 1 the non-actuable unit N times its advance green signal or its all red signal. In step switch position 2 it times only a very short interval and moves rapidly to step switch position 3, its green dwell position. There it resides until it is energized into position 4 by the closure of coordinating contacts A′ after a detector actuation has been registered on unit A.

The major portion of the circuits within non-actuable unit N have now been described but a few of the circuits remain to be described. They relate to free opration, homing after replacement, and stop timing. Free opration is defined as non-coordinated operation; homing has to do with returning each unit to dwell condition when it is replaced in the circuit; stop timing is employed to hold the unit in one position while action ensues in another unit. Each of these function will be explained below.

*Free operation*

During free operation one or more of the local intersection controllers may be permitted to operate free or non-coordinated with the master controller. Each local controller is permitted to answer detector actuations on the cross street substantially as they occur. The local controllers each dwell with the right of way signal illuminated to the thoroughfare and the stop signal illuminated to the cross street. As vehicles approach an intersection on the cross street they actuate the respective detector and enter a call on actuable unit A. Unit A is allowed to answer the call almost immediately if unit N has completed timing a minimum interval after the previous cross street right of way period. Unit A may retain right of way for up to a maximum interval timed by a maximum timer within the actuable unit. If a number of vehicles continue to arrive on a cross street they may hold the right of way for up to the maximum interval. Thereafter, right of way is taken away for a minimum period while the thoroughfare is allowed to clear. After the minimum interval, right of way is returned to the cross street for the density initial interval and at least one unit extension interval.

During free operation the free relay CR3 is energized to make the various circuit transfers required to disconnect the local controller from the influence of coordinating dial CD and to connect the various minimum and maximum timers into the circuit. Each of these transfers will be described in detail after the method of energizing the free relay is explained.

When the programmer or traffic volume computer in the master controller decides that non-coordinated operation shall be permitted, the master controller energizes a control conductor which connects to each of the local controllers. Each local controller is provided with a free control switch SW13 on the face of unit N, FIGURE 2, which in the closed position permits the local controller to respond to free operation when demanded by the master. When free control switch SW13 is in the open position the local controller continues to time in coordination with the master and disregards the free signal. Thus, controllers used in the downtown grid may be kept coordinated, while those used at outlying intersections may be set free.

When free operation is demanded by the master controller it applies L2 power to an interconnecting conductor and thence to unit connector UC2–4, shown at the bottom of FIGURE 6A. Power flows to relay coil CR3–C through the following circuit: unit connector UC2–4, free control switch SW13–1 in the closed position, jumper connector JC1–9, and in FIGURE 5, jumper connector JC1–9, free pickup relay contacts CR14–2 in the position shown, jumper connector JC1–10, and in FIGURE 6A, jumper connector JC1–10, free relay coil CR3–C, and line L1. Free pilot light F1 is energized through dropping resistor R15.

When free relay coil CR3–C is energized it transfers its four sets of contacts. Contacts CR3–1 insert the minimum thoroughfare timing potentiometer R9, shown near the center of FIGURE 6A, into the timing circuit which governs the duration of the minimum green interval to thoroughfare traffic. Contacts CR3–2 transfer and disconnect coordinating contacts A′, shown near the top of FIGURE 6A, from the plate circuit of the timing tube V4. Contacts CR3–3 transfer and disconnect the normal timing relay in actuable unit A from coordinating contacts B′–E′ and connect it to the maximum timing circuit in unit A. Contacts CR3–4 transfer and disconnect the normal timing relay in actuable unit B, when used, from coordinating contacts B″–E″ and connect it to the maximum timing circuit in unit B.

Each of these four transfer circuits will now be described in greater detail.

Referring specifically to FIGURE 6A, the transfer of free relay contacts CR3–1 disengages fast timing resistors R19, R20 from step switch positions 2 and 3 and connects the minimum timing resistor R9 into these positions. During coordinated operation the step switch moves rapidly through positions 2 and 3 and dwells in position 3. During free operation it times half the minimum interval in position 2 and half in position 3. The interval is timed in two halves to increase the range and accuracy of the resistance-capacitance timing circuit. It will be recalled that timed intervals are obtained by charging capacitor C1 and then permitting the charge to drain off through timing resistors R1, R2 at the same time that an alternating potential is applied to one side of capacitor C1 to reduce its apparent potential.

The circuit employed to determine the duration of the thoroughfare green 1 interval is governed by timing potentiometer R9 which may be adjusted with the green 1 dial G1 shown on the face of unit N, FIGURE 2. The circuit includes in FIGURE 6A the 105 v. source at unit connector UC2–6, the left hand side of timing potentiometer R9, the tap on potentiometer R9, line 17, now-transferred free relay contacts CR3–1, line L15, and in FIGURE 6, line L15, contacts at positions 2 and 3 of step switch bank 7, stepping arm A7, line L7, line L6, and in FIGURE 6A, line L6, coupling resistor R6, a portion of line L12, and the right hand side of capacitor C1.

The circuit associated with free relay contacts CR3–2 transfers the control of unit N from coordinating contacts A' to direct control from unit A. Contacts CR3–2 are located in the plate circuit of normal timing tube V4 shown near the top of FIGURE 6A. With contacts CR3–2 in the position shown they connect the plate circuit to jumper connector JC1–3 and thence to coordinating contacts A'. During non-coordinated operation, the plate circuit is removed from control of contacts A' and placed under direct control of actuable unit A.

It will be recalled that the detector memory relay in actuable unit A, upon being traffic actuated, applies L1 power to its unit connector UC2–3. Unit connector UC2–3 is connected in rack R to unit connector UC1–3 in unit C, shown at the top of FIGURE 5. A line connects unit connector UC1–3 to jumper connector JC1–6. In unit N, jumper connector JC1–6 is connected to stepping arm A8. When unit N is dwelling in its green dwell interval, step switch position 3, and the actuable unit becomes traffic actuated, the latter applies L1 power to the plate circuit of timing tube V4. The circuit includes unit connector UC2–3 of actuated unit A, a line in rack R to unit connector UC1–3 in unit C shown at the top of FIGURE 5, and a line to jumper connector JC1–6. In unit N, FIGURE 6, the circuit includes jumper connector JC1–6, stepping arm A8, a contact at position 3 of bank 8, line L11, and in FIGURE 6A, line L11, now-transferred contacts CR3–2, a portion of line L10, interrupter contacts CR1–INT–C, contacts CR4–1, normal timing relay coil CR2–C, and the plate of tube V4.

The actuated unit may thus complete the plate circuit in unit N. Normal timing tube V4 will not conduct immediately, however, unless its minimum timing circuit is timed out. The minimum timing circuit including timing resistor R1 and potentiometers R2 and R9 must permit the capacitor C1 to drain sufficiently to reduce its potential and thereby reduce the potential appearing at the grid of tube V4. This will not occur until the thoroughfare has received a guaranteed minimum interval after the last cross street right of way period.

Free relay contacts CR3–3 disconnect the normal timing relay in unit A from coordinating contacts B'–E' and connect it to a maximum timer in unit A. Contacts CR3–4 disconnect the normal timing relay in unit B, when used, from coordinating contacts B''–E'' and connect it to a maximum timer in unit B. This action serves to transfer the maximum timeout control for the actuated unit or units from the split control coordinating contacts to the maximum timer wihin each unit. Thus, during free operation the units govern themselves completely and are entirely disconnected from the coordinating unit and the master controller.

The maximum interval timer within unit A does not start timing immediately but must wait until its timing circuit is conditioned to time by unit N. After unit N has been moved from its green dwell interval, step switch position 3, and has timed its clearance intervals and arrived at its red dwell 1 interval, step switch position 10, unit N supplies L1 power to step switch arm A5 in unit A. When unit A reaches step switch positions 2, 3, and 4, the L1 circuit is completed to the maximum select relay coil CR4–C.

The maximum select relay has three sets of contacts. The first set closes and completes the circuit mentioned above to place the normal timing relay and the detector memory relay into the plate circuit of the maximum timing tube. The second set opens and removes the charging source from the maximum timing capacitor thereby permitting it to start to drain and time the maximum interval. The third set closes and rapidly discharges the timing capacitor for the density initial interval. If the unit is still in the density initial interval, the timing out of its capacitor causes the normal timing circuit to conduct and move the step switch rapidly through the remainder of the right of way intervals. The maximum interval will normally be set for a greater interval than the density initial interval.

Whenever the maximum timer times out it energizes the detector memory relay which holds in through a self holding contact and causes the unit to demand right of way after the non-actuable unit has timed a minimum right of way interval to phase N. The actuated unit will subsequently time another right of way period after the thoroughfare movement is given a minimum right of way interval.

It is thus shown that the free relay is adapted to convert the unit from coordinated to non-coordinated operation.

*Stop timing*

A stop timing relay is provided in non-actuable unit N to permit external control of any timing interval. The relay has two sets of contacts, one for breaking the plate circuit of tube V4 and one for completing the charging circuit for capacitor C1.

The stop timing relay coil CR4–C is shown at the bottom of FIGURE 6A and is connected between line L1 and unit connector UC2–7. The relay is normally energized to hold contacts CR4–1 and CR4–2 in the normal timing position and is deenergized to effect a delay in timing.

Examples of uses of the stop timing circuit are:

(a) Special railroad preemptors which effect a signal sequence which takes preference over the normal sequence.

(b) Firelane and emergency lane preemptors which have priority over the normal cycle.

(c) Special intersection controllers which require longer time settings than that obtainable on the dials.

When it is desired to stop the unit in a particular interval the stop timing relay coil CR4–C is deenergized. Contacts CR4–1 transfer and interrupt the plate circuit and partially complete the charging circuit for timing capacitor C1. Contacts CR4–2 close and fully complete the charging circuit for capacitor C1. It will be readily understood that when the stop timing relay is reenergized the plate circuit will be recompleted and the timing capacitor will begin to discharge and reinitiate the timing of the interval.

The charging path includes in FIGURE 6A line L4, now-closed contacts CR4–2, rectifier DR2, limiting resistor R4, capacitor C1, now-transferred contacts CR4–1, contacts CR1–INT–C in the position shown, line L10, and in FIGURE 6 line L10, contacts at positions 1, 2, 4, 5, 6, 7, and 9 of bank 9, stepping arm A9, jumper connector JC1–13, and line L1. In step switch position 8 the circuit also includes the contact at position 8 of bank 8, stepping arm A8, jumper connector JC1–6, and in unit C, FIGURE 5, jumper connector JC1–6 and a line to unit connector UC1–3. If actuable unit A has been traffic actuated, L1 power will be available at unit connector UC1–3.

During step switch positions 3, 10, and 11 the non-actuable unit does not time and thus has no provision for maintaining the charge on capacitor C1.

While the non-actuatable unit is operating non-coordinated with the master, the unit actually times during step switch position 3 and therefore a circuit is provided to maintain the charge on capacitor C1 during interval 3. Free relay contacts CR3–2 are transferred from the position shown in FIGURE 6A and transfer the recharging circuit from line L10 to line L11 and a contact at position 3 of bank 8. L1 power is available at stepping arm A8 from jumper connector JC1–6 and the actuable unit if it has been traffic actuated.

*Homing*

When one or more of the plug-in units is removed from the terminal facilities and allowed to operate in a test rack or has its step switch stepped manually, the controller units must be placed in their proper step switch position before the traffic signal lights are energized. The normal dwell position for a two phase semi-actuated controller is with unit N resting in its green dwell interval, step switch position 3 and actuable unit A resting in its red dwell 1 interval, step switch position 10.

A homing switch and circuits are provided in rack R for urging the units to move to the respective intervals named above. The switch is a four pole single throw device; one pole is used for each of the following functions:

(1) Break L4 power to the traffic signal light circuits.

(2) Apply L1 power to unit connector UC2–11 in unit N to energize its step switch to step switch position 3.

(3) Break 105 volt power to unit A to cause its timing capacitor to appear less negatively charged and therefore timed out. This permits the unit to time rapidly through its intervals until it arrives at step switch position 10 where there is no timing circuit provided. The actuable unit therefore rests in its red dwell 1 interval, step switch position 10.

(4) Apply L1 power to unit A to permit it to time through the failsafe interval step switch position 8. It will be recalled from the description of failsafe operation that each unit stalls in its final green signal position if power is not supplied by another unit to permit it to move out of that position.

The circuit within unit N employed to home the step switch to position 3 is illustrated near the center of FIGURE 6A and consists of step switch off-normal contacts CR1–B and interrupter contacts CR1–INT–B. When the homing switch applies L1 power to unit connector UC2–11 it energizes the step switch coil CR1–C. The circuit includes a source of L1 power in the terminal facilities T, FIGURE 2, now-closed homing contacts (not shown), a line to unit connector UC2–11 in unit N, FIGURE 6A, off-normal contacts CR–B, interrupter contacts CR1–INT–B, step switch coil CR1–C, rectifier DR4, and line L4.

As soon as the step switch coil is energized it operates interrupter contacts CR1–INT–B which break the circuit and deenergize the step switch coil. Rectifier DR3 is provided to permit the collapsing field around coil CR1–C to generate a sustaining current which permits the coil to maintain itself for a short time to prevent chattering. When the coil becomes sufficiently deenergized it permits the operating spring to move the stepping arms and then permits contacts CR1–INT–B to close again. The coil is reenergized and the action repeats itself until the step switch moves into position 3. In position 3 the off-normal contacts CR1–B open and break the homing circuit. Unit N thereafter rests in its green dwell interval. The homing switch is opened manually after the units have been homed.

The action within unit A and any other actuable unit employed is somewhat similar.

The circuit which breaks L4 power to the traffic signals is simple and is not shown in the drawings.

It will be apparent that the homing switch is manually returned to normal position when the units have reached their respective dwell positions, as mentioned above. The time required for homing may be only a few seconds and a timer could be installed to accomplish the opening of the homing circuits after the expiration of such a period. In the present form of the invention this has not been sidered necessary, however.

LOAD RELAYS

Up to this point in the description of the invention, very little has been said about the load relays. The load relays control the actual energization and deenergization of the signals and for unit N are illustrated in electric symbols at the right hand side of FIGURE 6. The relays for the entire controller are shown in outline form at the bottom of FIGURE 2. The operating coils for those associated with phase N are shown in FIGURE 6.

Throughout the description and particularly in the section describing the manner of obtaining the various signal sequences, reference was made to the different combinations of relay hookups which are possible. These include hookups for the normal green and amber relays, for advance green, for phase overlap, for walk-wait signals, and for phase overlap with an all red indication.

One of the important purposes of the step switch shown in FIGURE 6 is to energize the various load relays at the proper time in the cycle. Table IV below shows the interval or intervals during which the various load relays are energized. Also tabulated are the unit connectors energized and the pilot lights illuminated.

TABLE IV

| Load Relay | Intervals Energized | Connector | Pilot Light | Limiting Resistor |
|---|---|---|---|---|
| Advance Green | 1 | UC2–3 | | |
| Green 1 | 2, 3, 4, 5 | UC2–1 | G1′ | R18. |
| Green 2 | 2, 3, 4, 5, 6, 7, 8 | UC2–14 | G2′ | R17. |
| Walk 1 | 2, 3, 4 | UC2–21 | | |
| Walk 2 | 2, 3, 4, 5, 6, 7 | UC2–22 | W1 | R16. |
| Amber 1 | 6 | UC2–2 | | |
| Amber 2 | 9 | UC2–15 | | |
| Overlap Green Control. | 10, 11 | {JC1–12<br>UC1–21 | | |
| Overlap Amber Select. | 11 | UC2–12 | | |

The circuits employed for connecting the load relays and their contacts in various combinations for effecting the different signal combinations will be described in a later section.

TRAFFIC ACTUABLE UNIT

Traffic actuable unit A is a complete unit in itself and may be jacked into the rack R and thereby connected into the terminal facilities T to control and time all of the vehicle and pedestrian intervals for one street.

Only those portions of actuable unit A which are necessary to a full understanding of the invention will be disclosed in the present application. The timing dials and the intervals controlled thereby are described herein as an aid to understanding the invention. Only those circuits which are relevant to the present invention will be shown. These consist essentially of the circuits shown in FIGURES 7–12, and those described in the following section.

The actuable unit has eleven timing dials, two switches, and six pilot lights mounted on its front plate. An eleven position step switch within the unit is timed through a complete traffic signal sequence by nine of the timing dials. A three position step switch within the unit is timed through two intervals of pedestrian movement by two of the timing dials. Table V below shows the position of the step switch, the name of the interval, and the name of the timing dial which controls the duration of the interval. See FIGURE 4 for a graphic representation of these intervals and various combinations of signal sequences.

TABLE V

Actuable Unit Intervals

| Step Switch Position | Interval | Dial Nomenclature |
|---|---|---|
| 1 | Advance green interval or all red clearance interval. | Special Clearance 2. |
| 2 | Minimum initial interval and density initial interval. | Initial. Minimum. |
| 3 | Green dwell interval | |
| 4 | Unit extension interval | Unit Extension. May be terminated by Maximum. |
| 5 | Vehicle clearance interval 1 | Vehicle Clearance 1. |
| 6 | Special clearance interval 1 | Special Clearance 1. |
| 7 | Green interval 2 | Green 2. |
| 8 | Green dwell and phase select interval. | |
| 9 | Vehicle clearance interval 2 | Vehicle Clearance 2. |
| 10 | Red dwell 1 | |
| 11 | Red dwell 2 and phase overlap control. | |
| 2A | Pedestrian walk interval | Pedestrian Walk. |
| 4A | Pedestrian guaranteed clearance interval. | Pedestrian Clearance. |

All of the above named intervals need not be used at any one intersection. An interval can be essentially omitted by turning the dial on its timing potentiometer down to the index mark. This gives the interval a very short duration. The step switch still steps through the interval, however. The manner in which the load relays LR are connected into the terminal facilities T determines the signal display and sequence.

*Switches*

Two switches are provided on the face of the actuable unit: a vehicle recall switch SW1, and a pedestrian recall switch SW2. The vehicle recall switch SW1 bridges around the vehicle detector memory relay self-holding contacts so that the vehicle sequence is displayed and timed each cycle. Power to the vehicle memory relay is interrupted by the step switch during the unit extension interval so that a maximum interval will not be timed each cycle. Repeated detector actuation may cause the interval to extend to maximum, however, when the need arises. When a vehicle actuates the detector during the single vehicle interval given each cycle, the vehicle interval is extended. If additional vehicles actuate the detector during the vehicle interval, the interval is extended for each actuation.

The pedestrian recall switch SW2 bridges around the pedestrian memory relay self-holding contacts so that the pedestrian sequence may be displayed each cycle. With the pedestrian recall switch in the On position, a pedestrian phase of timed walk and clearance intervals is inserted once each cycle. Depression of one or more of the pedestrian pushbuttons PB at the intersection will have no effect on the pedestrian signals on this phase if the pedestrian recall switch is in the On position.

*Pilot lights*

Six following pilot lights PL1–PL6 are located on the face of the actuable unit:

| Function: | Designation |
|---|---|
| Effective green 1 | PL1 |
| Walk interval | PL2 |
| Effective green 2 | PL3 |
| Pedestrian memory | PL4 |
| Vehicle memory | PL5 |
| Vehicle detector | PL6 |

The pilot labeled Effective Green 1 is iluminated during the minimum or density initial interval, the green dwell interval, and the unit extension interval. The pilot light labeled Effective Green 2 is illuminated during the trailing green interval Green 2, and the second green dwell and phase select interval.

The pilot light labeled Vehicle Detector is illuminated each time one of the vehicle detectors D1–D4 is actuated.

The pilot lights labeled Vehicle Memory and Pedestrian Memory are illuminated when the vehicle memory relay or the pedestrian memory relay, respectively, are energized to indicate that a vehicle or pedestrian actuation has been registered.

*Actuated phase sequence*

The intervals obtainable from the highly flexible actuable unit are:

(A) Advance green or all red clearance
(B) Density initial
(C) Minimum initial
(D) Green dwell
(E) Unit extension
(F) Vehicle clearance 1
(G) Special clearance 1
(H) Green 2
(I) Green dwell and phase select
(J) Vehicle clearance 2
(K) Red dwell 1
(L) Red dwell 2 and phase overlap control
(M) Pedestrian walk
(N) Pedestrian clearance
(O) Maximum The above intervals are defined and obtained as follows:

(A) Advance green interval. This is the first interval in the sequence and may be used to time an advance green signal indication ahead of the normal green period to permit advance turning movements, for example. The setting on the special clearance dial SC1′ determines the duration of the advance green movement.

The first interval may be used instead as an all red clearance interval between the non-actuable phase and this phase. The setting on dial SC1′ then determines the time that the red signals are illuminated to both phases between phase movements.

(B) Density initial. The setting on the density initial dial DI determines the amount of time allowed for the passage of each vehicle which arrived during the previous stop signal. If dial DI is set at 3 seconds, for example, and five vehicles actuate the cross street detectors D1–D4 during the time right of way is denied to the cross street, the intitial interval will be 15 seconds to permit the five vehicles to pass.

(C) Minimum initial. The setting on the minimum initial dial MI determines the minimum duration of the initial interval. It is normally set to permit the passage of one or two vehicles which may have been stopped the previous cycle. If only one actuation has occurred during the stop period the normal density initial interval may be too short for the start up, acceleration and passage of one vehicle.

(D) Green dwell. This interval is not used when the actuable unit is used with a master adjusted coordinating unit C and a non-actuable timing unit N. The interval is used when two or more actuable units are employed as a fully actuated controller. When employed as part of a fully actuated controler each unit may dwell in its green dwell interval until an actuation occurs on another phase. Thereupon, the actuated unit moves to the unit extension interval. No dial is required for the green dwell interval.

(E) Unit extension. During the unit extension interval additional time is provided after each detector actuation during the unit extension interval to allow passage time for the actuating vehicle. The setting on dial EXT determines the seconds of additional right of way time given after each detector actuation. The seconds awarded for each actuation do not add together; the extension timer is merely reset and starts to retime after each actuation. The timer may be reset by continued actuation up to a limit determined by the setting of maximum timer dial MAX.

(F) Vehicle clearance 1. During this interval the amber signal is illuminated and the normal right of way (Green 1) period terminated. Dial VC1′ determines the duration of the vehicle clearance interval.

During coordinated operation the coordination dial CD on the coordinating unit C causes the termination of the unit extension interval and the start of the vehicle clearance interval. This insures that the actuable movement will be timed out and right of way returned to the thoroughfare in time for progression along the thoroughfare. When there are only a few traffic actuations on the cross street the actuable phase terminates itself and returns right of way to the thoroughfare before the time for progression along the thoroughfare. Time unused by cross street traffic is awarded to the thoroughfare.

(G) Special Clearance 1. This interval may be used to provide an all red clearance interval between the Green 1 period and the Green 2 period when the actuable unit is used by itself as a semi-actuated controller at a two street intersection. The first five intervals may be assigned to the actuable phase and the last six intervals assigned to the non-actuable phase.

(H) Green 2. Dial G2″ determines the time that the trailing green period continues after the normal Green 1 period terminates. The trailing green interval may be employed for example at a wide or divided intersection to permit vehicles to cross the second portion of the intersection.

(I) Green dwell 2 and phase select. This interval serves three functions depending upon how the unit is used. When used by itself to control a two street intersection, the unit dwells in this interval with the green signal illuminated to main street traffic and the stop signal illuminated to cross street traffic.

When the unit is employed as part of a fully actuated controller or as part of a multiphase semi-actuated controller with one or more identical actuable units, the interval is utilized near the end of the right of way period to examine the condition of all succeeding actuable units to determine whether they have been traffic actuated. The unit timing out energizes the step switch in the next actuated unit. This moves it from its red dwell condition to its phase overlap control condition. In its phase overlap control condition the next unit energizes an amber signal to the overlap phase losing right of way. The duration of the amber interval is determined by the first actuable unit, the unit which is timing.

The phase select interval has no timing dial but is timed with a short timing resistor within the unit. If at the end of the interval no actuation has occurred on a succeeding actuable unit, the phase select circuit will apply power to the step switch in the non-actuable unit N and move it to its red dwell 2 position.

This interval also serves as a green dwell interval when the unit is part of a fully actuated controller. If power should fail between the time another actuable unit was traffic actuated and the time right of way was awarded to that phase, the detector memory relay would drop open and remain open. When power returned, the unit relinquishing control would move to its red dwell condition and the intersection would show red signals in all directions. A feature of the invention requires that the unit relinquishing control move to a green dwell position and reexamine the condition of the traffic actuated unit before going to its red dwell condition.

(J) Vehicle Clearance 2. This interval times an amber clearance signal after the trailing green period. It is controlled by dial VC2′. At the end of the interval when the normal timing relay contacts close they energize the unit into its red dwell 1 position and simultaneously energize and step the succeeding traffic actuated unit or non-actuable unit N from its red dwell 2 interval to its Special Clearance 2 interval. The subject unit dwells in its red dwell 1 position until an actuation occurs on that phase. The unit assuming control continues to time its phase movement.

When the subject actuable unit is used with a similar actuable unit as a fully actuated controller, the same stepping action takes place. When the subject unit steps from its vehicle clearance 2 interval to its red dwell 1 interval it also supplies power to the succeeding unit to step it from its red dwell 2 interval of its special clearance 2 or advance green interval.

(K) Red dwell 1. This interval was mentioned in the above paragraphs describing the phase selection function. The actuable unit dwells in its red dwell 1 interval until a detector actuation occurs on the cross street. No timer or dial is required because this interval is not timed.

(L) Red dwell 2 and phase overlap control. When an actuation occurs on the subject phase while the unit resides in the red dwell 1 interval, the unit attempts to step the non-actuable unit N from its green dwell interval and thereby initiate the beginning of the end of the non-actuable phase. The actual end of the non-actuable phase is started when contacts A′ on the coordination dial CD close a circuit near the end of the thoroughfare right of way time. When unit N times through its subsequent intervals and reaches its phase selection interval it energizes both its own step switch and the step switch in the actuated unit. The latter is stepped to its red dwell 2 interval as explained above.

Similarly, when two actuable units are employed together as a fully actuated controller, and the one residing in the red dwell 1 interval receives a detector actuation, it energizes the step switch in the other unit if the other unit is dwelling in its green dwell interval. This causes the latter to time its clearance intervals and move to its red dwell 1 interval where it energizes the first actuated unit out of its red dwell 1 interval into its red dwell 2 interval.

The red dwell 2 interval is of short duration and is employed to energize an overlap control relay which in turn energizes the proper amber signal relay. The phase overlap control is utilized as part of a multiphase actuated control unit.

(M) Pedestrian walk. The duration of the walk interval parallel with the actuable phase movement is controlled by pedestrian walk dial PW. The walk period starts at the beginning of the minimum and density initial interval and extends into the green dwell interval. It times in parallel with the normal Green 1 period. It is controlled by a separate timer built into the actuable unit.

(N) Pedestrian clearance. The duration of the pedestrian clearance interval is controlled by dial PC1′. The interval starts after the walk interval has timed out. The clearance interval is guaranteed; that is, it must be completed before the actuable unit can step from the unit extension interval to the vehicle clearance 1 interval.

(O) Maximum. The duration of the maximum interval is determined by the setting of dial MAX. No step switch position is required because the maximum timer times concurrently with other interval timers. When the actuable unit is operating in conjunction with a coordinating unit C the coordination dial CD determines the maximum time that the actuated phase may retain right of way with continued detector actuation.

When the coordinating unit C is operating "free" of the master controller, as when traffic is very light, the maximum timer is effective to limit the duration of the actuated phase. The maximum timer is started each time the actuable unit enters the initial interval. The maximum timer times during the density and minimum initial interval and during the unit extension interval. If the dial MAX is set at the lower end of its scale the maximum timer may time out during the initial interval. If the dial MAX is set for a longer interval the maximum timer will time out during the unit extension interval. It is normally set for a longer interval. When the maximum interval transpires the unit is forced to time its clearance intervals and relinquish right of way to phase N.

When the actuable unit is used with another such actuable unit as a fully actuated controller, the maximum timer does not start timing until a detector actuation occurs on the other phase. Thus, one control unit can retain right of way indefinitely until an actuation occurs on the other phase.

The maximum timer may be superseded by the guaranteed pedestrian clearance timer. The total of the walk and clearance intervals as set on dials PW and PC1′ is normally short enough that it does not interfere with the timing of the vehicle intervals. The total should be less than the shortest time allowed for the cross street right of way period. The shortest cross street right of way period will occur when the shortest cycle length and the greatest split is demanded by the master. The shortest cycle length allows the least time for both phases, and the greatest split favors the non-actuable phase to the detriment of the actuated phase.

The requirement that the walk and clearance intervals total less than the least cross street right of way period is more easily comprehended when it is understood that the coordination dial keys K1–K4 are used to terminate the actuated phase. This is described in a later section. If this requirement cannot be met, the guaranteed pedestrian clearance timer supersedes the maximum timer and renders same ineffective. Thus, the guaranteed pedestrian clearance interval takes preference over the maximum interval.

A complete internal wiring diagram of the actuable units is not supplied in this application. Only those circuits which are essential to an understanding of the phase select and transfer function are shown. These are illustrated in line-to-line schematic form. The main body of circuits within the actuable unit are thus not disclosed in the present application.

The circuits within actuable unit A which are relevant to the present invention are shown in FIGURES 7–12 and are described below through a complete cycle of operation.

CYCLE OF OPERATION

The circuits employed to transfer right of way from the non-actuated phase to the actuated phase are shown in FIGURES 7–12. Each figure illustrates a single circuit. Each circuit is employed for a single purpose: to move the step switch in one or the other or both units to the next position. The table below names the important elements in the circuit and indicates which unit's step switch is moved to the next position.

| Figure | Circuit Elements | Moves Unit N To Interval | Moves Unit A To Interval |
|---|---|---|---|
| 7 | Detector memory relay coordinating contacts, and plate circuit. | 4 | ---------- |
| 8 | Detector memory relay, normal timing relay. | 9 | 11 |
| 9 | Detector memory relay, normal timing relay. | 10 | 1 |
| 10 | Coordinating contacts | ---------- | 5 |
| 11 | Normal timing relay | 11 | 9 |
| 12 | Normal timing relay | 1 | 10 |

In a two phase controller the circuits shown may be somewhat more complex than required, but this is necessary because the unit must be compatible with other units and with other combinations of units. The circuits are the same as those employed in a three or four phase controller.

To describe the complete action assume that actuable unit A is dwelling in its red dwell 1 interval which corresponds to step switch position 10, and that non-actuable unit N is dwelling in its green dwell interval which corresponds to step switch position 3. These are the normal dwell positions for each unit.

Assume now that a vehicle detector actuation occurs on the cross street. Closure of detector memory relay contacts CR2–3 in unit A, FIGURE 7, results in the application of L1 power to unit connector UC1–3 in coordinating unit C. L1 power is thus available at the top contact of coordinating contacts A′ and at jumper connector JC1–6.

Figure 7:
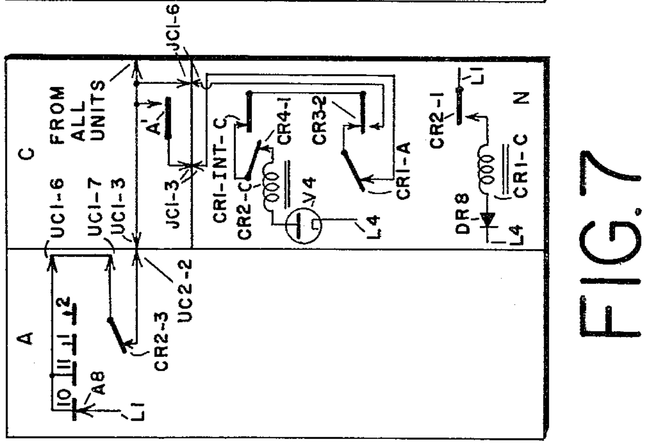

When the non-actuable unit N is operating free of the master controller and free relay contacts CR3–2 are transferred from the position shown in FIGURE 7, the normal timing plate circuit is immediately completed. The circuit includes in unit A, line L1, stepping arm A8, a contact at position 10 of bank 8, unit connector UC1–6, a jumper to unit connector UC1–7, detector memory relay contacts CR2–3 in the position shown, and unit connector UC2–2. Within rack R a line connects unit connector UC2–2 to unit connector UC1–3 in unit C. In unit C the circuit includes unit connector UC1–3 and a line to jumper connector JC1–6. In unit N the circuit includes jumper connector JC1–6, contacts CR3–2 in the transferred position, interrupter contacts CR1–INT–C, stop timing contacts CR4–1, normal timing relay coil CR2–C, and the plate of tube V4. An additional circuit in unit N includes line L1, normal timing relay contacts CR2–1, step switch coil CR1–C, rectifier DR4, and line L4.

If the grid of normal timing tube V4 is sufficiently less negative to permit tube V4 to conduct it does so and energizes the plate circuit relay coil CR2–C. Closure of contacts CR2–1 energizes the step switch coil CR1–C. Interrupter contacts CR1–INT–C open and deenergize relay coil CR2–C. Contacts CR2–1 open and deenergize the step switch. The compressed operating spring moves the step switch out of its dwell position 3 into position 4. Unit N times through position 4 rapidly and thereafter times its pedestrian and vehicle clearance intervals and arrives at the phase select interval step switch position illustrated in FIGURE 8.

When the non-actuable unit N is operating coordinated with the master controller and free relay contacts CR3–2 are as shown in FIGURE 7, a different circuit is utilized to move the non-actuable unit N out of its dwell interval. L1 power is available at the top contact of coordinating contact pair A′ but is not effective to move the non-actuable unit until a time established by the master controller. When key K0 on coordination dial CD closes contacts A′, L1 power is made available to the plate circuit of normal timing tube V4. The first part of the circuit is as described above. The second part includes contacts A′, jumper connector JC1–3, and in unit N, jumper connector JC1–3 off normal step switch contacts CR1–A which are closed only in position 3, free relay contacts CR3–2 in the position shown, interrupter contacts CR1–INT–C, stop timing relay contacts CR4–1, normal timing relay coil CR2–C, and the plate of tube V4.

The grid of tube V4 has been made sufficiently less negative during the dwell interval so that when power is applied to the plate of tube V4 by the closure of contacts A′, tube V4 will conduct. When tube V4 conducts it energizes the normal timing relay coil CR2–C. Contacts CR2–1 close and energize the step switch coil CR1–C. Interrupter contacts CR1–INT–C open and deenergize the normal timing relay coil CR2–C. Contacts CR2–1 open and deenergize the step switch coil. The step switch moves from its green dwell position 3 into position 4. Unit N times through position 4 rapidly and subsequently times its pedestrian and vehicle clearance intervals and arrives at position 8, its phase select interval. This is shown in FIGURE 8.

The descriptions given above show that there are two methods of moving the non-actuable unit out of its dwell position 3. The first is effective when the controller is operating free of the master controller and the second is effective when the controller is coordinated with the master controller.

Referring now to FIGURE 8, the phase select circuit is illustrated in its simplest form. The purpose of the circuit is to find which phase unit desires right of way. The circuit assumes its simplest form when only one actuable unit is used but is designed to accommodate any number of actuable units. Any phase unit desiring right of way is able to energize the common circuit to unit connector UC1–3 unit C shown in FIGURE 7 to urge the non-actuable unit to end its right of way period. The next operation is to find which unit desires right of way and to move it into its second red dwell position. The non-actuable unit must also energize and time the pedestrian and vehicle clearance signals to phase N which is losing right of way. Unit N must also know not to display a clearance signal to any movement which overlaps the non-actuable phase and the actuated phase next appearing.

The phase select circuit illustrated in FIGURE 8 includes line L1 from jumper connector JC1–13, step switch arm A9, a contact at position 8 of bank 9, line L19, normal timing plate circuit relay contacts CR2–2, and unit connector UC2–16. Within rack R a line connects unit connector UC2–16 to unit connector UC2–16 in unit A. In actuated unit A the circuit includes unit connector UC2–16, memory relay contacts CR2–4 in the energized position shown, line L30, a contact at position 10 of bank 4, stepping arm A4, line L31, step switch relay coil CR7–C, rectifier DR8, and line L4. An additional circuit in unit N includes line L1, normal timing relay contacts CR2–1, step switch coil CR1–C, rectifier DR4, and line L4.

When the non-actuable unit completes the timing of the pedestrian clearance and phase select interval and its normal timing relay coil CR2–C is energized, contacts CR2–2 close and permit unit N to energize the step switch in unit A. Contacts CR2–1 also close and energize the step switch in unit N. When interrupter contacts CR1–INT–C, FIGURE 7, transfer they break the plate circuit and deenergize normal timing relay coil CR2–C. Contacts CR2–1 and CR2–2 both open and deenergize the step switches in units N and A, respectively. The step switches in both units step to the next position simultaneously. Unit N steps to the vehicle clearance 2 interval, step switch position 9, and times the clearance signal after the trailing green period. Unit A steps to its red dwell 2 interval, step switch position 11, where it dwells momentarily unitil again stepped by unit N.

PHASE OVERLAP CONTROL

During the vehicle clearance 2 interval, step switch position 9, non-actuable unit N is able to time a clearance signal for an overlapping phase which does not overlap the phase next to be timed. It is apparent that a two street intersection may not lend itself to an overlapping phase movement and therefore this feature is of more importance in a three or more phase controller.

In a multiphase configuration, one function of the red dwell 2 interval is to provide a control interval for an overlap phase clearance period. While the unit which is about to receive right of way is in its red dwell 2 and overlap control interval, step switch position 11, a contact on the step switch at position 11, bank 2, completes an L4 circuit to the overlap amber load relay coil. This load relay has contacts which transfer and remove power from the overlap green signal and apply it to the overlap amber signal. The interval is timed by the unit losing right of way, in this example, non-actuable unit N. Unit N times both its own amber signal and the phase overlap amber signal. The units are as shown in FIGURE 9 during this interval.

The timing circuit employed during the vehicle clearance 2 interval includes potentiometer R13 shown near the center of FIGURE 6 and short timing resistor R8 and potentiometer R5 shown near the center of FIGURE 6A. When the potential on the left hand side of timing capacitor C1 becomes sufficiently less negative to permit tube V4 to conduct, tube V4 conducts and energizes the normal timing relay coil CR2–C. Relay contacts CR2–1, FIGURE 9, close and energize the step switch coil CR1–C in unit N. Relay contacts CR2–3 also close and complete the remainder of the circuit shown in FIGURE 9.

The circuit includes in unit A, line L1, step switch arm A8, a contact at position 11 of bank 8, a line to unit connector UC1–6, a bridge to unit connector UC1–7, detector memory relay contacts CR2–3 in the energized position shown and unit connector UC2–2. Within rack R the circuit includes a line to unit connector UC1–3 of coordinating unit C. In unit C the circuit includes unit connector UC1–3, and a line to jumper connector JC1–6. In unit N the circuit includes jumper connector JC1–6, a line to step switch arm A8, a contact at position 9 of bank 8, line L18, contacts CR2–3, and unit connector UC2–13. Unit connector UC2–13 in unit N is connected to the same numbered connector in unit A. In unit A the circuit includes unit connector UC2–13, line L32, a contact at position 11 of bank 4, step switch arm A4, line L31, step switch coil CR7–C, restifier DR8, and line L4.

When non-actuable unit N completes timing the vehicle clearance 2 interval as explained above and energizes the normal timing relay coil CR2–C, contacts CR2–1 and CR2–3 are closed. Contacts CR2–1 complete the circuit to step switch coil CR1–C in unit N, and contacts CR2–3 complete the circuit to step switch coil CR7–C in actuated unit A. Operation of interrupter contacts CR1–INT–C, FIGURE 7, interrupts the normal timing plate circuit and deenergizes normal timing relay coil CR2–C. Contacts CR2–1 and CR2–3 open and deenergize both step switch coils. The step switches in both units move to the next interval simultaneously. The step switch in unit N moves to its red dwell 1 interval, step switch position 10, and the step switch in unit A moves to its special clearance 2 interval, step switch position 1. In these intervals unit N dwells and unit A displays and times an advance green signal or an all red clearance signal.

The circuits described immediately above with reference to FIGURE 8 and 9 may be termed advance cycle selection circuits. When more than one actuable unit is used, these circuits determine which one of the actuated units will next be selected to time a right of way period. As stated previosuly, the actuated unit or units which have registered a vehicle actuation inform the non-actuable unit and cause it to terminate its right of way periods and thereafter to time its clearance intervals. At the end of the phase select interval, step switch position 8, FIGURE 8, unit N selects the unit which will time the next right of way period. Unit N actually energizes and steps the actuated unit from its position 10 to its position 11. In position 11 the overlap control is effective to energize the amber relay on the overlap phase. The overlap amber interval is timed simultaneously with the non-actuable phase amber interval. Then, at the end of the amber interval, unit N again steps both itself and the selected unit. The selected unit starts to time its right of way periods and unit N assumes its dwell position. The phase selection is thus completed.

TIMING OF PHASE A

The above description illustrates the method by which the circuits within actuated unit A urge unit N to terminate its right of way period and transfer right of way to actuated phase A. It will now be explained how unit A times its right of way and clearance intervals and returns right of way to the non-actuable phase.

When unit A is moved to its advance green interval, step switch position 1, it assumes complete control. Unit N has moved to its red dwell 1 interval, step switch position 10, and remains there. Only unit A is able to move unit N out of its dwell positions and into its timing intervals.

In step switch position 1 unit A times the special clearance 2 signal. This may consist of an advance green indication to permit turns before the main movement or it may consist of an all red clearing interval. If neither movement is desired at a particular intersection the interval may be substantially eliminated by turning dial SC2′ down to its index mark.

Following the clearance interval is the density initial interval. Its duration is proportional to the number of detector actuations occurring while right of way is denied to phase A. The initial interval is intended to permit all of the vehicles stopped by the stop signal to move through the intersection.

After the density initial interval, unit A times rapidly through the green dwell position and starts to time the unit extension interval. The green dwell position is used only when the actuated unit is employed as part of a fully actuated controller.

In step switch position 4 unit A starts to time the unit extension interval. The duration of one unit extension interval is sufficient to permit a moving vehicle to pass the detector and enter and clear the intersection if it is not impeded by other vehicles. Each actuation of one of the detectors D1–D4 resets the unit extension time and causes it to start timing another unit extension interval.

Figure 10:
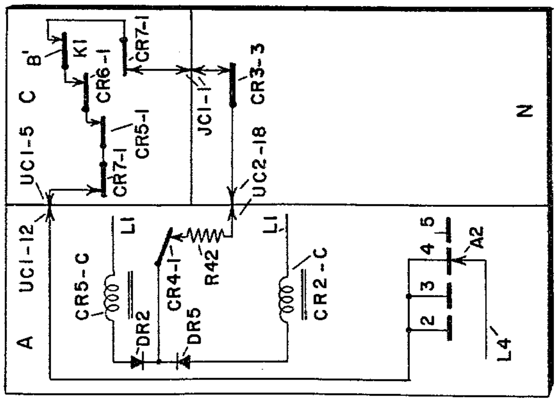

While unit A is timing either the green dwell interval, the density initial interval, or the unit extension interval, its maximum timeout circuit is completed as is shown in FIGURE 10. Contacts at positions 2, 3, and 4 of step switch bank 2 are bridged together and are connected in circuit with the maximum timeout contacts B′–E′ in coordinating unit C. The condition of the master controlled split control conductors 24, 25, FIGURE 5, determines which of the split control contacts B′–E′ is effective to terminate the phase A right of way movement.

Referring specifically to FIGURE 10 and assuming that split S1 is in effect, contacts B′ will control the termination of phase A at the proper split of the cycle. Unit A is shown in its unit extension interval, step switch position 4. An L4 circuit exists from unit A, through unit C, through unit N, and back to the normal timing relay coil CR5–C in unit A. Contacts B′ in unit C are normally open and are closed by key K1 on coordination dial CD. The circuit includes in unit A, line 4, stepping arm A2, contacts at positions 2, 3, and 4 of bank 2, and a line to unit connector UC1–12. A line in rack R connects unit connector UC1–12 to unit connector UC1–5 in unit C. In unit C the circuit includes unit connector UC1–5, phase control contacts CR7–3, split control contacts CR5–1, split control contacts CR6–1, maximum timeout contacts B′, phase control contacts CR7–1, and jumper connector JC1–1. In unit N the circuit includes jumper connector JC1–1, free relay contacts CR3–3, and unit connector UC2–18. The latter connector is jumpered to the same numbered connector in unit A. In unit A the circuit includes unit connector UC2–18, resistor R42, stop timing relay contacts CR4–1, rectifier DR2, step switch coil CR5–C, and line L1. From the movable contact of contacts CR4–1, the circuit also includes rectifier DR5, detector memory relay coil CR2–C, and line L1. When key K1 closes contacts B′, at the selected split of the cycle, the circuit is complete to the normal timing relay coil CR5–C and to the detector memory relay coil CR2–C. It is apparent that the maximum timeout circuit is effective only when continued detector actuations attempt to hold the phase A right of way past the time normally allotted for the actuated phase at the particular split determined by the master controller.

If a different split was being demanded by the master controller, contacts B′ would be ineffective and one of the sets of contacts C′–E′ would be effective.

The circuit described above illustrates that actuated unit A can be forced to relinquish control of right of way at a time and a division of the cycle determined by the master controller.

When the effective one of the split control contacts B′–E′ is closed by the proper key K1–K4, the normal timing relay coil CR5–C and the vehicle detector memory relay coil CR2–C are energized. Contacts CR5–1, FIGURE 11, close and energize the step switch in unit A. The step switch is thereby moved into the vehicle clearance 1 interval, step switch position 5. Unit A subsequently times the remainder of its vehicle clearance and pedestrian clearance intervals and arrives at position 8, its phase select interval. This is illustrated in FIGURE 11.

Unit A could also have timed out of its own accord after all detector actuations are answered. That is, if the unit extension timer times out because no additional detector actuations occur and reset it, it energizes normal timing relay coil CR5–C. Rectified L4 power is applied to the left hand side of normal timing relay coil CR5–C. The pulsating direct current cannot pass through rectifier DR5 and energize memory relay coil CR2–C. The memory circuit is thus ineffective to cause a return of the phase A movement after the non-actuable movement.

Figure 11:
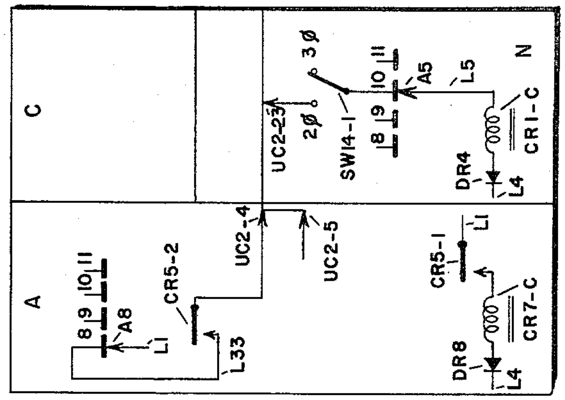

Referring now to FIGURE 11, unit A is shown in its phase select interval, step switch position 8. In step switch position 8 an L1 circuit is partially completed from unit A to the step switch coil CR1–C in unit N. This circuit enables unit A to transfer control back to unit N. In a multi-phase installation, this circuit and a continuation thereof is employed to interrogate the remaining actuated units to determine whether a vehicle or pedestrian actuation has occurred on any actuable unit. If it has, right of way is then transferred to the next actuated phase. In this simple two phase controller, however, interrogation is not required and is not made because selector switch SW14–1 in unit N is thrown to the two phase position.

The circuit includes in unit A, line L1, stepping arm A8, a contact at position 8 of bank 8, line L33, normal timing relay contacts CR5–2, and a line to unit connector UC2–4. In rack R a line connects unit connector UC2–4 to unit connector UC2–23 in unit N. In unit N the circuit includes unit connector UC2–23, switch SW14–1 in the position shown, a contact at position 10 of bank 5, stepping arm A5, line L5, step switch coil CR1–C, rectifier DR4, and line L4. Another circuit in unit A includes line L1, normal timing relay contacts CR5–1, step switch coil CR7–C, rectifier DR8, and line L4.

When the normal timing relay coil CR5–C is energized at the end of the phase select interval, contacts CR5–1 and CR5–2 are closed. The former complete the circuit to the step switch in unit A; the latter complete the circuit to the step switch in unit N. Thus, both step switches are energized simultaneously. When power to the normal timing relay coil CR5–C is interrupted, contacts CR5–1 and CR5–2 open and permit both step switches to advance simultaneously. The step switch in unit N advances to position 11 and the step switch in unit A advances to position 9. In position 9, unit A times the overlap amber interval to the overlap amber signal controlled by unit N. In a two phase controller there is normally no overlapping phase and the overlap amber sequence is not used.

While unit A is in position 9, and unit N is in position 11, an L1 circuit between unit A and the step switch coil in unit N is partially completed. This circuit is illustrated in FIGURE 12 and includes in unit A, line L1, stepping arm A5, a contact at position 9 of bank 5, normal timing relay contacts CR5–3 and unit connector UC2–13. A line in rack R connects together both unit connectors UC2–13. In unit N, the circuit includes unit connector UC2–13, line L14, a contact at position 11 of bank 5, stepping arm A5, line L5, step switch coil CR1–C, rectifier DR4, and line L4. An additional circuit in unit A includes line L1, normal timing relay contacts CR5–1, step switch coil CR7–C, rectifier DR8, and line L4.

When the vehicle clearance 2 interval is timed out, the normal timing relay coil CR5–C is energized and contacts CR5–1 and CR5–3 are closed. The former complete the circuit to the step switch in unit A. The latter complete the circuit to the step switch in unit N. Thus, both step switches are energized simultaneously. Interrupter contacts on the step switch in unit A interrupt power to the normal timing relay coil CR5–C which opens contacts CR5–1 and CR5–3. Both step switch coils are deenergized simultaneously and both step switches advance to their next position. The step switch in unit A moves to position 10, its red dwell 1 interval. The step switch in unit N moves to the special clearance 2 interval, step switch position 1 at which position unit N regains control. Unit A dwells until another actuation occurs on phase A. Unit N times through its clearance interval 1 and its minimum green intervals 2 and 3 and dwells in position 3. Thus, one cycle of operation is completed.

*Memory circuit*

In connection with the description of FIGURE 10, it was noted that the vehicle detector memory relay coil CR2–C was energized at the same time that the normal timing relay coil CR5–C was energized. This occurs only if unit A is forced to time out by closure of the effective one of the maximum timeout contacts B′–E′. This occurs only when continued actuation of one or more of the detectors D1–D4 attempts to hold phase A past the time normally allotted for that phase. Energization of the detector memory relay completes a self holding circuit and unit A thus remembers that it was forced to time out before it had sufficient time to answer all detector actuations.

Another cycle of operation is started after unit N has timed a minimum interval. During coordinated operation the minimum interval is terminated when contacts A′ are closed by coordinating dial key K0. During free operation the minimum interval is timed by potentiometer R9 during step switch positions 2 and 3, half of the interval being timed in each step switch position.

Thereafter, unit A is thus called back to provide another phase A right of way movement. The cycle may repeat itself if further actuation of one or more of the detectors D1–D4 occurs during the unit extension interval and attempts to retain right of way on phase A beyond the time allotted for phase A.

*Power failure safety feature*

In the event that power should fail between the time the actuable unit has received a traffic actuation and the subsequent transfer of right of way to that phase, the controller could stall in an all red condition unless provision is made to prevent such occurrence. An all red condition is defined as one in which the stop signals are illuminated to all phases. A special circuit is included in the non-actuable unit which opens the plate circuit in the non-actuable unit during the eighth step switch position to stall the non-actuable unit in its final green position until urged therefrom by another detector actuation on the actuable phase. The plate circuit in the non-actuable unit is normally completed through the detector memory relay in the actuated unit; as long as no interruption in power occurs, the memory relay holds in through its own holding contacts and completes the plate circuit for the non-actuable unit during step switch position 8.

If power should fail at the time noted above and permit the detector memory relay to become deenergized, the non-actuable unit comes to rest in its final green interval with the right of way signal illuminated to the thoroughfare. There the unit remains until another detector actuation occurs and reenergizes the detector memory relay in unit A. Thereafter, unit N transfers right of way to the actuated unit.

Because many modifications may be made in the above construction and many widely different embodiments of this invention may be made without departing from the scope and spirit thereof, it is intended that all matter contained in the above description and shown in the accompanying drawings shall be interpreted as illustrative and not in a limiting sense.

I claim:

1. In a two phase semi-actuated traffic control system, the control means comprising: a non-traffic actuable unit adapted to control and time a plurality of right of way and clearance intervals to a main street, an interchangeable traffic actuable unit adapted to control and time a plurality of right of way and clearance intervals to a cross street, a master controller adapted to establish a potential traffic signal cycle, a coordinating unit electrically connected to said master controller and to each of said actuable and non-actuable units and adapted to coordinate the start and the maximum duration of timing of each of said units with said potential traffic signal cycle established by said master controller, a traffic detector in said cross street and a detector memory relay in said actuable unit having contacts closed after actuation of said detector, normally open coordinating contacts in said coordinating unit closed momentarily near the beginning of each potential traffic signal cycle, and a control circuit in said non-actuable unit connected to be completed through said coordinating contacts and said detector memory relay contacts and adapted to start said non-actuable unit timing the end of its right of way interval and the beginning of its clearance interval to said main street at a particular time in said potential traffic signal cycle.

2. In a traffic control system as claimed in claim 1, including a traffic detector along a cross street, a controller, including a maximum timing circuit comprising a plurality of pairs of normally open contacts, means for momentarily closing said pairs of contacts at a plurality of divisions of a traffic signal cycle, said actuable unit controlled by the closure of one of said plurality of contact pairs to end the actuated phase right of way period at a particular division of the traffic signal cycle when continued traffic detector actuation attempts to hold the right of way on said cross street beyond the time for the start of the main street right of way interval.

3. A controller as in claim 1, including a plate circuit in said non-actuable unit, a detector memory relay in said actuable unit having contacts closed after a first actuation and energization thereof and connected to said non-actuable unit through said normally open contacts on said coordinating unit and connected to said plate circuit in said non-actuable unit, said plate circuit being energized through said coordinating contacts and said detector memory relay contacts when said coordinating contacts close to energize said non-actuable unit out of its right of way awarding intervals into its clearance timing intervals.

4. A controller as in claim 1, said non-actuable unit having means adapted to time a right of way interval and having other means adapted to time a clearance interval, said actuable unit including a detector memory relay connected to be energized through a traffic detector in said cross street, said coordinating unit having normally open contact means closed near the beginning of each said potential traffic signal cycle, a series circuit including contacts on said detector memory relay and said normally open contact means in said coordinating unit and a circuit in said non-actuable unit, said series circuit adapted to be completed when said normally open contacts in said coordinating unit close at a particular time in said potential traffic signal cycle after said detector memory relay has been energized by traffic actuation, said circuit when completed adapted to energize said non-actuable unit out of its right of way timing interval and into its clearance timing interval.

5. A traffic controller as in claim 1, including a coordinating circuit having normally open contact means in said coordinating unit closed at the start of each potential traffic signal cycle, and having a plurality of normally open contact means each of which is closed at different potential divisions of said cycle, contact actuating means in said coordinating unit adjustable from said master controller, a circuit originating in said actuable unit and including the first mentioned normally open contact means and connected after traffic actuation of said traffic actuable unit to energize said non-actuable unit and force it to end its right of way awarding condition and energize itself through a clearance timing condition at a time determined by said coordinating unit, additional circuit means between said non-actuable unit and said actuable unit connected to permit said non-actuable unit to energize said actuable unit to a right of way awarding condition when said non-actuable unit energizes itself to a right of way denying condition, additional circuit means originating in said actuable unit and including one of said plurality of contacts connected to force said actuated unit to complete its right of way awarding condition and energize itself into a clearance timing condition at a time determined by said coordinating unit, and circuit means between said actuable unit and said non-actuable unit connected to energize said non-actuable unit to a right of way awarding condition at the same time said actuable unit energizes itself to a right of way denying condition.

6. In a traffic control system comprised of individual timing units for each traffic phase, each of said timing units having a right of way denying condition and a right of way awarding condition and at least one intermediate condition; circuit means interconnecting said units to permit one of said units to dwell in its right of way awarding condition and the others of said units to dwell in their right of way denying condition; one of said units being non-responsive to traffic flow in its phase of control, traffic actuable detector means in at least one traffic phase to signal the timing and control unit for the same phase, each of said units having circuit means to energize said one unit from its right of way awarding condition into its clearance timing condition, circuit means to permit the unit timing the clearing condition to energize the traffic actuated actuable unit into a ready condition, circuit means connecting said non-actuable unit with said actuated actuable unit to permit said non actuable unit to energize said actuated actuable unit as said non-actuable unit times out of its clearance timing condition into its right of way denying condition to thereby energize said traffic actuated actuable unit into its right of way awarding condition.

7. In a control system of claim 6, circuit means in said actuated actuable unit to permit said unit to time its right of way awarding conditions and thereafter to time its clearance timing conditions and near the end of said clearance timing conditions to energize said non-actuable unit into a ready condition, and other circuit means in said actuated actuable unit to energize said non-actuable unit into its right of way awarding condition at the same time said actuable unit energizes itself into its right of way denying condition.

8. For use with a master controller during coordinated and non-coordinated operation, an intersection traffic signal controller having independent means for controlling the time of energization and the duration of energization of stop, go, and caution signals for two interfering traffic movements; the duration controlling means including a traffic actuable timing and control unit and a non-traffic actuable timing and control unit each for timing the duration of go and caution signals for the respective traffic movements during both coordinated and non-coordinated operation; the time controlling means during coordinated operation including a coordinating unit for coordinating the time of start and the maximum timing of said actuable unit and the minimum timing of said non-actuable unit in relation to a potential traffic signal cycle established by the master controller; the time controlling means during non-coordinated operation including a maximum timer in said actuable unit and a minimum timer in said non-actuable unit; and selector means in said intersection controller controlled from the master controller for making effective said coordinating unit during coordinated operation and for making effective said maximum and minimum timers during non-coordinated operation.

9. In a control system for regulating a two phase traffic, the signalling controls including in combination, a non-traffic actuable unit having means for timing a plurality of right of way and clearance intervals for a major street, said unit including a normally inoperative minimum interval timer operative upon demand from a master controller; a traffic actuable timing unit having means for timing a plurality of right of way and clearance intervals for a minor street, additional timing means in said traffic actuable unit resettable upon traffic actuation during the interval timed by said timing means; a coordinating unit having means for ending the timing of said non-actuable unit and for timing the start of said actuable unit, said coordinating unit having additional means for ending the timing of said actuable unit and for restarting said non-actuable unit; a master controller having means for normally imposing on said coordinating unit a potential traffic cycle timing, means in said coordinating unit operable upon demand from said master controller for freeing said coordinating unit from control by said master controller; and maximum timing means in said actuable unit operative when said coordinating unit is operating free of said master controller to actuate said actuable unit to complete its right of way period and time its clearance intervals and return control to said non-actuable unit, said minimum interval timer operative when said coordinating unit is operating free of said master controller to time a minimum interval to said major street.

10. In a two phase semi-actuated traffic signal controller having two individual timing means one for each of two traffic phases and circuit means in said individual timing means to cause one of said timing means to dwell in a right of way denying condition and the other to dwell in a right of way awarding condition and circuit means effective after the arrival of a unit of traffic on one street to energize the one timing means from a dwell condition denying right of way to a dwell condition permitting right of way after the other timing means is energized from a dwell condition awarding right of way to a dwell condition denying right of way to said other street, the improvement comprising a failsafe circuit operative in the event of power failure after the arrival of a unit of traffic on said one street and before right of way is awarded to said one street, said circuit including circuit means in said other timing means open shortly before said timing means reaches its dwell condition denying right of way to said one street and closable by said one timing means after the arrival of another unit of traffic on said one street, said circuit serving to prevent said other timing means from arriving in its right of way denying condition without transferring right of way to said one timing means.

11. In an intersection traffic signal controller having individual timing and control means for each traffic phase, individual timing and control means for each of said phases including a stepping device, means to step said device from one dwell position through a first plurality of timing positions to a second dwell position and thence through a second plurality of timing positions and back to said one dwell position, traffic actuable means for at least one traffic phase connected to the individual timing and control means thereof and upon actuation serving to actuate its timing and control means to energize another of said timing and control means from its one dwell position through its first plurality of timing positions, said another timing and control means serving to energize the first timing and control means from its dwell position during one of its first plurality of timing positions, circuit means in the latter timing and control means adapted to open during one of said first plurality of timing positions and thereby stall itself, and circuit means in the first timing and control means closed after traffic actuation of same and connected to bridge around said open circuit means in the timing and control means relinquishing control to permit same to energize itself into its second dwell position and at the same time energize the non-traffic actuable means from its first timing and control means into its second plurality of timing positions.

12. In a multiphase traffic signal control system having independent timing units for each traffic phase, the structure wherein one of the said units is non-traffic actuable and at least one of the units is traffic actuable, a coordinating unit to control the start of timing by each of the units in coordination with a potential traffic signal cycle established by a master controller and imposed on the intersection controller through said coordinating unit, said control system operative to provide for the complete omission of a phase movement in the absence of traffic thereon, a circuit originating in the actuable unit and connected serially through the coordinating unit and thence through the at least one actuable unit, said circuit partially closed by means in the at least one actuable unit after it has been traffic actuated and completely closed by means in the coordinating unit at a particular time in said potential traffic signal cycle, said circuit when completely closed adapted to energize said non-actuable unit from a dwell condition into a timing condition, a transfer circuit between said non-actuable unit and said actuable unit and adapted near the completion of the timing condition in said non-actuable unit to energize said actuated unit from its dwell condition into a timing condition at the same time said non-actuable unit energizes itself from its timing condition to its dwell condition, said actuated unit adapted to time its right of way and clearance intervals and retransfer control to said non-actuable unit.

13. In a multiphase traffic control system having an actuable master coordinated traffic signal controller, the subcombination including: a coordinating unit connected to a master controller and adapted to time the termination of the right of way periods for a non-actuated phase and for at least one actuated phase, a non-actuated phase timing unit having at least a green dwell position and clearance timing positions and a red dwell position, at least one traffic actuated phase timing unit having at least a green dwell position and clearance timing positions and a red dwell position, a circuit to cause said controller to rest with said non-actuated unit dwelling in its green dwell position and said at least one actuated unit dwelling in its red dwell position, each said at least one actuated unit operative to energize said non-actuated unit from its green dwell position into its clearance timing positions upon closure of first contacts in said coordinating unit after traffic actuation of said actuated unit, said non-actuated unit adapted to time a clearance interval and then to energize said actuated unit from its red dwell position into its right of way timing position, said actuated unit adapted to time its right of way and clearance intervals and thereafter to energize said non-actuated unit from its red dwell position to its green dwell position at the same time said actuated unit energizes itself into its red dwell position.

14. In a multiphase traffic signal controller having traffic responsive and non-traffic responsive units and a potential cycle timing device for determining the time of start of said units and for limiting their duration, the subcombination comprising: circuit means in said non-traffic responsive unit adapted to permit said unit to normally dwell in a condition awarding right of way to a main street and denying right of way to a cross street, circuit means in said traffic responsive unit adapted to permit said unit to normally dwell in a condition denying right of way to a cross street but in the presence of traffic thereon to award right of way to said cross street at a controlled time in said potential traffic signal cycle, a selector circuit to permit said traffic responsive unit in cooperation with said potential cycle timing device to energize the non-traffic responsive unit from its right of way indicating interval to a caution timing and indicating interval, a transfer circuit to permit said non-traffic responsive unit near the end of its caution timing interval to energize said traffic responsive unit from a dwell position to a control position, a second transfer circuit to permit said non-traffic responsive unit at the end of its caution timing interval to deny right of way to said main street and to energize said traffic responsive unit, a reselect circuit completed in said traffic responsive unit near the end of its caution timing intervals and connected to reenergize said non-traffic responsive unit, and a retransfer circuit completed in said traffic responsive unit and connected to reenergize said non-traffic responsive unit and to retransfer control to said non-traffic responsive unit at the same time said traffic responsive unit denies right of way to said cross street.

15. In a controller as in claim 14, minimum interval timing means in said non-traffic responsive unit connected through said retransfer circuit and energized thereby to time a minimum right of way interval to said main street and thereafter dwell with right of way awarded to said main street and denied to said cross street.

16. In a controller adapted for use at an intersection having at least two interfering traffic phases and at least two pedestrian phases, a master adjusted coordinating unit including potential traffic cycle timing means remotely adjustable as to speed and phase relationship and having a plurality of contacts and contact operating means arranged to divide the total potential traffic signal cycle into at least two potential portions, a non-actuable vehicle and pedestrian timing unit including a multi-position step switch and individual timing means for a plurality of said step switch positions, at least one vehicle and pedesterian actuable timing unit including a multi-position step switch and individual timing means for a plurality of said step switch positions, vehicle and pedestrian detector means for at least one of said interfering traffic phases connected to actuate said at least one vehicle and pedestrian actuable timing unit, a calling circuit partially completed by the actuation of said actuable unit and fully completed by first contact means in said master adjusted coordinating unit, said calling circuit to energize said step switch in said non-actuable timing unit from its normal dwell position to its clearance timing position at a particular time in said potential cycle, a selector circuit originating in said non-actuable unit and adapted to energize said step switch in said actuated unit from a first dwell position to a control position, control means in said actuated unit and energizing means in said non-actuable unit to energize said non-actuable unit to a dwell position and said actuated unit to a right of way timing position, circuit means in said actuated unit adapted to time said step switch in said actuated unit through at least one vehicle and pedestrian right of way interval and thence to a reselect interval, a reselect circuit originating in said actuated unit and connected to said non-actuable unit, said reselect circuit operative to energize said nonactuable unit from its said dwell position to a second dwell position, said circuit including means in said actuated unit to energize its said step switch to a dwell position and to energize the step switch in said non-actuable unit to its right of way timing position, said non-actuable unit having circuit means adapted to time a right of way interval and thereafter energize its step switch to its dwell position.

17. In a controller adapted for use at an intersection having at least two interfering traffic phases, a master adjusted coordinating unit including potential traffic cycle timing means remotely adjustable as to speed and phase relationship and having a plurality of contacts and contact operating means arranged to divide the total potential cycle into at least two potential portions, a non-actuable timing unit including a multi-position step switch and individual timing circuit means for timing the duration of a plurality of said step switch positions, at least one traffic actuable timing unit including a multi-position step switch and individual timing circuit means for timing the duration of a plurality of said step switch positions, detector means for at least one of said interfering traffic phases connected to actuate said traffic actuable timing unit, a circuit partially completed by the actuation of said actuable timing unit and completed by first contact means on said coordinating unit and connected to energize said step switch in said non-actuable timing unit from its normal right of way awarding position to its clearance timing position, a circuit originating in said non-actuable unit and adapted to energize said step switch in the actuated actuable unit from a right of way denying position to a control position, a control circuit originating in the actuated actuable unit and completed by said non-actuable unit to energize the step switch in the actuated actuable unit to a clearance timing position, control means in the actuated actuable unit and timing means in said non-actuable unit connected to energize said non-actuable unit to a right of way denying position and the actuated actuable unit to a right of way timing position, said timing circuit means in the actuated actuable unit adapted to time said step switch in said actuable unit through at least one right of way interval and thence through at least one clearance interval, said timing circuit means adapted to be reset by continued actuation of said detector means, a maximum timing circuit originating in the actuated actuable unit and connected to be effective upon continued actuation of said detector means, said maximum timing circuit completed by second contact means on said coordinating unit, said maximum timing circuit connected to energize said actuated actuable unit from its said right of way timing position to a clearance timing position and thereafter to energize said step switch in the actuated actuable unit to a right of way denying position and to energize the step switch in said non-actuable unit to its right of way timing position, said timing circuit means in said non-actuable unit adapted to time a minimum right of way interval and thereafter energize its said step switch to its said right of way awarding position.

18. A traffic control unit for a traffic control system including at least two intersecting right of ways one of which is given preference in the absence of traffic movement on the other right of way, comprising a normally inactive timing means of said control unit, means for initiating said timing means responsively to traffic movement on one of said non preferred right of ways, means for transferring operation from said preferred right of way control unit, means for receiving return of control from a non preferred right of way, additional timing means for assuring at least a minimum time of control by said preferred right of way control unit, and means for residing indefinite control in said unit until one or more of the detector units in the non preferred right of way is actuated.

19. In a control system for regulating the actuation of traffic lights at a multiphase intersection, an electrical circuit comprising a master controller having a plurality of relays and companion switches providing a plurality of selectively actuated circuits, a local controller including switch-operating arms disposed at spaced intervals thereon, switching means for each of said selectively actuated circuits and operative by a corresponding one of said switching arms to determine the initiation and ending of the energization one of said circuits, and conductor means having operative connection with said switches controlled by said switch-operating arms and connecting with lights of respective said phases to effect an electrical output in accordance with the timing and duration established by said master controller.

20. In a control system as defined in claim 19, wherein said local controller is comprised of a continuously rotatable member having said arms thereon and adapted to actuate in sequence the switches connecting said selectively actuated circuits to provide an electrical output, said operating arms being disposed circumferentially to communicate phase split actuation to a respective one of said outputs.

References Cited by the Examiner

UNITED STATES PATENTS

| | | | |
|---|---|---|---|
| 2,834,001 | 5/58 | Wilcox | 340—41 |
| 2,883,645 | 4/59 | Du Vivier | 340—41 |
| 2,989,728 | 6/61 | Barker | 340—35 |
| 3,056,946 | 10/62 | Brockett | 340—37 |
| 3,078,440 | 2/63 | Hilliker | 340—37 |

NEIL C. READ, *Primary Examiner.*

BENNETT G. MILLER, THOMAS B. HABECKER, *Examiners.*